United States Patent
Mimori

(10) Patent No.: US 8,385,181 B2
(45) Date of Patent: Feb. 26, 2013

(54) OBJECTIVE LENS AND OPTICAL PICKUP APPARATUS

(75) Inventor: Mitsuru Mimori, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 245 days.

(21) Appl. No.: 12/994,446

(22) PCT Filed: May 21, 2009

(86) PCT No.: PCT/JP2009/059341
§ 371 (c)(1),
(2), (4) Date: Nov. 23, 2010

(87) PCT Pub. No.: WO2009/145103
PCT Pub. Date: Dec. 3, 2009

(65) Prior Publication Data
US 2011/0075546 A1 Mar. 31, 2011

(30) Foreign Application Priority Data
May 27, 2008 (JP) .................... 2008-138021

(51) Int. Cl.
*G11B 7/135* (2006.01)
(52) U.S. Cl. .................................... 369/112.12
(58) Field of Classification Search .............. None
See application file for complete search history.

(56) References Cited

U.S. PATENT DOCUMENTS

| | | | | |
|---|---|---|---|---|
| 6,515,955 B2* | 2/2003 | Takeuchi | ............... | 369/112.08 |
| 7,206,276 B2* | 4/2007 | Kimura et al. | ........... | 369/112.08 |
| 8,064,315 B2* | 11/2011 | Yasui | ...................... | 369/112.08 |

FOREIGN PATENT DOCUMENTS

| | | |
|---|---|---|
| JP | 2005-141800 | 6/2005 |
| JP | 2006-310438 | 11/2006 |
| JP | 2007-294101 | 11/2007 |

* cited by examiner

*Primary Examiner* — Joseph Feild
*Assistant Examiner* — Parul Gupta
(74) *Attorney, Agent, or Firm* — Cozen O'Connor

(57) ABSTRACT

Provided are an optical pickup apparatus and an objective lens which can appropriately record and/or reproduce information on three types of discs with different recording densities and improve the light-utilization efficiency using a simple structure. A first optical path difference providing structure is formed on an optical surface of the objective lens. The first optical path difference providing structure is a step structure in which plural ring-shaped step units each including the same number of steps are arranged concentrically about the optical axis as the center. The width w1 in the direction perpendicular to the optical axis of the highest step or the lowest step in at least one step unit in the step structure is approximately half of the average value w2 of two steps at both sides of the highest step or the lowest step in the direction perpendicular to the optical axis.

20 Claims, 11 Drawing Sheets

$$W2 = \frac{WB + WA}{2}$$

OBJECTIVE LENS AND OPTICAL PICKUP APPARATUS

RELATED APPLICATIONS

This application is a U.S. National Phase Application under 35 USC 371 of International Application PCT/JP2009/059341 filed May 21, 2009.

This application claims the priority of Japanese application 2008-138021 filed May 27, 2008, the entire content of which is hereby incorporated by reference.

TECHNICAL FIELD

The present invention relates to an optical pickup apparatus which can record and/or reproduce information compatibly for various types of optical discs, and to an objective lens for use in the same.

BACKGROUND ART

In recent years, in an optical pickup apparatus, a wavelength of a laser light source which is employed as a light source for reproducing information recorded on an optical disc and for recording information on an optical disc, is becoming shorter. For example, a laser light source having 400-420 nm wavelength, such as a blue-violet semiconductor laser and a blue-SHG laser which converts wavelength of an infrared semiconductor laser utilizing a second harmonic wave, is reaching the stage of practical application. A use of these blue-violet laser light sources enables to record information of about 15 GB on an optical disc with a diameter of 12 cm, when an objective lens with a numerical aperture (NA) which is the same as a DVD (Digital Versatile Disc) is used. When NA is increased up to 0.85, information of about 25 GB can be recorded onto an optical disc with a diameter of 12 cm. In this specification, an optical disc and an optical-magnetic disc which employ a blue-violet laser light source are referred as "high density optical discs" as a general name.

Hereupon, in a high density optical disc using an objective lens with NA of 0.85, coma caused due to an inclination (skew) of the optical disc becomes larger. Therefore, some high density optical discs using the objective lens with NA of 0.85, are designed so that its protective layer has thinner thickness (which is 0.1 mm, while that of a DVD is 0.6 mm) than that of a DVD, to reduce the amount of coma due to the skew. On the other hand, it is hard to say that a value of an optical disc player/recorder (optical information recording reproducing apparatus) as a product is not enough under just a condition that it can record and/or reproduce information for the above high density optical discs properly. Taking account of a fact that, at present, DVDs and CDs (Compact Disc) onto which various kinds of information have been recorded, are on the market, it is not enough that information can be recorded/reproduced only for the above high density optical disc properly. For example, realization of recording and/or reproducing information appropriately also for DVDs and CDs which are owned by users, leads to enhancement of its commercial value as an optical disc player/recorder for high density optical discs. From these backgrounds, an optical pickup apparatus installed in an optical disc player/recorder for high density optical discs is required to be capable of appropriately recording and/or reproducing information not only for the high density optical discs but also for DVDs and CDs.

As a method capable to record and/or reproduce information adequately to anyone of high density optical discs and DVDs and further to CDs, with maintaining compatibility, there can be considered a method to selectively switch an optical system for high density optical discs and an optical system for DVDs and CDs, corresponding to the recording density of an optical disc on which information is recorded and/or reproduced. However, it is disadvantageous for the size-reduction and increases the cost, because it requires a plurality of optical systems.

Accordingly, in order to simplify the structure of an optical pickup apparatus and to intend the reduction of cost, it is preferable to make an optical system for the high density optical discs and an optical system for DVDs and CDs into a common optical system, and to reduce the number of optical parts constructing the optical pickup apparatus as much as possible, even in the optical pickup apparatus with compatibility. Then, providing the common objective lens which is arranged with facing an optical disc, is most advantageous for the simplification of the construction and cost reduction of the optical pickup apparatus. Here, in order to obtain an objective lens which can be commonly used for plural kinds of optical discs for which different recording/reproducing wavelengths are used, it is required that there is formed an optical path difference providing structure having a wavelength dependency in spherical aberration, on the objective optical system, to reduce spherical aberrations caused by a difference in wavelength and a difference in thickness of protective layers.

Patent Literature 1 discloses an optical pickup apparatus equipped with an objective lens which includes an optical path difference providing structure of a step type with four steps and can be used compatibly for high density optical discs and conventional optical discs.

CITATION LIST

Patent Literature

Patent Literature 1: JP-A No. 2005-129227

SUMMARY OF INVENTION

Technical Problem

Incidentally, the objective lens in Patent Literature 1 employs a structure that is a step type of optical path difference providing structure which is formed by periodically repeating step units, each including four steps and small step differences extending along the optical axis and having the same height, wherein widths of the steps are almost the same to each other. Thereby, diffraction efficiencies of a blue-violet laser beam for high density optical discs and an infrared laser beam for CDs become high, but a diffraction efficiency of a red laser beam for DVDs can be decreased to some extent, which is a problem. To solve it, there can be considered a method of changing the number of steps in the step type of optical path difference providing structure into five steps, as a means to enhance the diffraction efficiency for DVDs. However, when five steps are employed, it can cause a problem that step differences become high and a fluctuation of the diffraction efficiency caused by a slight fluctuation of wavelength change becomes large. Additionally, diffraction efficiencies for respective light fluxes greatly change, which makes a problem that fine adjustments of the diffraction efficiencies are difficult. As described above, in conventional optical path difference providing structures of a step type, it has been difficult to make all of the diffraction efficiency for high density optical discs, the diffraction efficiency for DVDs, and the diffraction efficiency for CDs, high in a balanced condition. Especially, a diffraction efficiency when a DVD or CD is used can be so significantly deteriorated to make their compatible use impossible, under the condition to use the optical discs compatibly by employing diffracted light fluxes of special orders. For examples, there is cited an objective lens which has only a step type of optical path difference providing structure, and exhibits the following diffraction orders of diffracted light fluxes with the maximum light amount generated when light passes through the optical path difference providing structure: a first-order diffracted light for a high density optical disc, a minus-first-order diffracted light for a DVD, and a minus-second-order diffracted light for a CD. Further, the conventional art in Patent Literature 1 describes a step type grating in the other shape. However, the shape of the step type grating is complicated, and resin hardly enters especially into a narrowed area formed between high step differences. It makes production of a complex objective lens with a fine accuracy difficult, which is also a problem.

The prevent invention has been achieved in view of the above problems and aims to provide an optical pickup apparatus capable of recording and/or reproducing information properly for three types of discs with various recording densities, and an objective lens. Each of the optical pickup apparatus and the objective lens has a simple structure, allows fine adjustment of utilize efficiencies of light in a designing step with enhancing a transferability to a mold, and achieves well-balanced utilization efficiencies of light for a BD, DVD, and CD.

Solution to Problem

To solve the above problems, an invention described in Item 1 is an objective lens for an optical pickup apparatus comprising an objective lens. The objective lens is provided for forming a converged spot on an information recording surface of a first optical disc including a protective layer with a thickness t1 by using a first light flux with a wavelength λl emitted from a first light source, for forming a converged spot on an information recording surface of a second optical disc including a protective layer with a thickness t2 (t1<t2) by using a second light flux with a wavelength λ2(λ1 <λ2) emitted from a second light source, and for forming a converged spot on an information recording surface of a third optical disc including a protective layer with a thickness t3 (t2<t3) by using a third light flux with a wavelength λ3(λ2 <λ3) emitted from a third light source. The objective lens characterized in that an optical surface of the objective lens comprises a first optical path difference providing structure which is a step structure in which a plurality of ring-shaped step units each including same number of steps are arranged concentrically about an optical axis as a center, and the values of w1 and w2 satisfy the following relational expression, where w1 is a width in a perpendicular direction to the optical axis of one of a highest step and a lowest step of at least one of the step units, and w2 which is an average value of two steps arranged at both sides of the one of the highest step and the lowest step along a direction perpendicular to the optical axis:

$$0.2 \, w2 < w1 < 0.8 \, w2 \quad (1)$$

A principle of the present invention will be descried with referring to drawings. Fig. 1a is a sectional view obtained by cutting a first optical path difference providing structure of a step type in the conventional art along a plane including the optical axis. Fig. 1b is a sectional view obtained by cutting a first optical path difference providing structure of a step type of the present invention along a plane including the optical axis. Each of FIGS. 2a and 2b is a diagram showing diffraction efficiencies for respective wavelengths, with diffraction efficiency as a vertical axis and wavelength as the horizontal axis. Hereinafter, an first optical disc is described as a high density optical disc, a second optical disc is described as a DVD, and a third optical disc is described as a CD. However, the scope of the present invention will not be limited to them.

The optical path difference providing structure which is partially shown in Figs. 1a and 1b has a step structure in which step units SU each including the same number of steps are periodically repeated (the step units are concentrically formed about the optical axis as their center). In the example shown in Figs. 1a and 1b, there are five steps which are steps S1 to S5. The highest step is represented as S5 and the lowest step is represented as Sl. Neighboring steps are connected through a step difference extending along the direction of the optical axis by the same amount. Each of FIGS. 2a and 2b is a diagram showing diffraction efficiencies of light fluxes used for respective optical discs, with diffraction efficiency as a vertical axis and wavelength as the horizontal axis. The followings are described under the assumption that the first optical path difference providing structure is formed on a flat surface for an easy understanding.

In conventional first optical path difference providing structures of a step type, widths along a perpendicular distance to the optical axis of steps in a step unit was made to be the same, as shown in FIG. 1a. Therefore, as shown in FIG. 2a, the diffraction efficiency in the case of using a DVD (represented by the dotted line of 655 nm) fell below 50%, and the characteristics of the diffraction efficiency were hardly adjusted so as to shift the position of its peak. By changing the step amounts of respective steps along the direction of the optical axis, the characteristics of the diffraction efficiency can be changed. However, when the step amounts of respective steps along the direction of the optical axis were changed, the change amounts became so large not to carry out the adjustment and a predetermined optical path difference was hard to be obtained, which were problems.

Accordingly, the present inventor has found that as a result of his earnest study, characteristics of the diffraction efficiency can be adjusted by changing the widths of the steps along the perpendicular direction to the optical axis without changing the step amounts along the optical axis direction. More concretely, as shown in FIG. 1b, the macroscopic height of a step unit (the position where the dotted line in the figure crosses the vertical axis at the right side in the figure) can be changed by increasing the widths of steps S1, S2, S3, and S4 except for highest step S5 along the direction perpendicular to the optical axis and decreasing width w1 of step S5 along the direction perpendicular to the optical axis so as to satisfy the expression (1), which enables to change the characteristics of the diffraction efficiency and also to carry out a fine adjustment of the diffraction efficiency. Thereby, as shown in FIG. 2b, the peak position of the wave form of the diffraction efficiency of a light flux for a DVD can shift to a longer-wavelength side. It enables to enhance the efficiency of a light flux for a DVD and to provide a first optical path difference providing structure hardly changing due to a wavelength change because the entire wave form of the diffraction efficiency for a DVD has a gentle curve and an inclination of a wave form at the wavelength for a DVD also become gentle. Corresponding to those, the peak position of the wave form of the diffraction efficiency of a light flux for a CD also shifts to a longer-wavelength side. However, as for a CD, the entire waveform originally has a gentle curve, thereby, the diffraction efficiency does not sufficiently decreased. Conventionally, the diffraction efficiency in the use of a DVD was decreased in optical path difference providing structures of a step type with five steps, and the diffraction efficiency in the use of a CD was decreased in optical path difference providing structures of a step type with four steps. On the other hand, the above structure enables to keep high diffraction efficiencies in the use of a DVD and a CD without decreasing the diffraction efficiency in the use of a high density optical disc. Further, in one step unit, steps other than the highest step or the lowest step can have broadened widths. Thereby, its mold can be made easily and excellent transferability can be maintained. The above structure is preferable in these points, too.

The objective lens described in Item 2 is characterized in that, according to the invention of Item 1, in all the step units in the step structure, one of the highest step and the lowest step satisfy the expression (1). Thereby, the amount of light which can be used for recording and reproducing information for a DVD can be more increased. Further, a first optical path difference providing structure exhibiting less fluctuation of the light amount due to the wavelength change can be provided.

The objective lens of Item 3, characterized in that, according to the invention of Items 1 or 2, the optical surface of the objective lens comprises at least a central area including the optical axis, a peripheral area in a ring shape formed around the central area, and a most peripheral area in a ring shape formed around the peripheral area, the first light flux which has passed through the central area, the peripheral area, and the most peripheral area is converged so that information can be recorded and/or reproduced on the information recording surface of the first optical disc, the second light flux which has passed through the central area and the peripheral area is converged so that information can be recorded and/or reproduced on the information recording surface of the second optical disc, and the second light flux which has passed through the most peripheral area is not converged so that information can be recorded and/or reproduced on the information recording surface of the second optical disc, the third light flux which has passed through the central area is converged so that information can be recorded and/or reproduced on the information recording surface of the third optical disc, and the third light flux which has passed through the peripheral area and the most peripheral area is not converged so that information can be recorded and/or reproduced on the information recording surface of the third optical disc, and the first optical path difference providing structure is formed in the central area.

The objective lens described in Item 4 is characterized in that, according to the invention of any one of items 1 to 3, only the lowest step satisfies the expression (1). Therefore, for example, when the objective lens is molded with a mold, the highest step is broaden, which allows lens material to enter an inner part of the mold. Thereby, transferability is enhanced and a problem of manufacturing error is reduced. As a result, loss of light amount can be reduced and utilizing effect of light is reduced, which is preferable.

The objective lens described in claim item 5 is characterized in that, according to the invention of any one of items 1 to 4, the first optical path difference providing structure is an optical path difference providing structure that makes an amount of first-order diffracted light of the first light flux which has passed through the first optical path difference providing structure larger than amounts of diffracted light of any other orders (including a zero-th order), makes an amount of minus-first-order diffracted light of the second light flux which has passed through the first optical path difference providing structure larger than amounts of diffracted light of any other orders (including a zero-th order), and makes an amount of minus-second-order diffracted light of the third light flux which has passed through the first optical path difference providing structure larger than amounts of diffracted light of any other orders (including a zero-th order).

With referring to the drawings, a principal of the present invention is described. Each of FIGS. 3a, 3b and 3c is a sectional view of a step type of first optical path difference providing structure generating diffracted light relating to claim 5, obtained by cutting the first optical path difference providing structure along a plane including the optical axis. Each of FIGS. 4a, 4b and 4c is a diagram showing diffraction efficiencies of respective wavelengths, where the vertical axis represents the diffraction efficiencies and the horizontal axis represents a wavelength. Herein, it is described under the assumption that the first optical path difference providing structure is formed on a plane surface for an easy understanding.

In FIGS. 3a, 3b and 3c, there is provided a first optical path difference providing structure being a step structure in which step units SU each having the same number of steps are periodically repeated (are formed concentrically around the optical axis as the center). Examples of FIGS. 3a and 3c show steps Si to S5, where the number of steps is five, S5 is the highest step, and S1 is the lowest step. Neighboring steps are connected with each other through a step difference extending along the direction of the optical axis. The example of FIG. 3b shows steps Si to S4, where the number of steps is four, S4 is the highest step, and S1 is the lowest step. Neighboring steps are similarly connected with each other through a step difference extending by the same amount to the others along the direction of the optical axis.

First, the first optical path difference providing structure shown in FIG. 3a as Comparative example 1 has diffraction characteristics as shown in FIG. 4a. More concretely, the first order diffracted light of the first wavelength has a peak value around 405 nm, the minus first order diffracted light of the second wavelength has a peak value around 580 nm, and the minus second order diffracted light of the third wavelength has a peak value around 770 nm. Accordingly, when a light flux with a wavelength around 405 nm is used as the first light flux, and when a light flux with a wavelength around 785 nm is used as third light flux, the diffraction efficiencies each having a value close to the peak value of the wave form can be obtained. When a light flux with a wavelength around 645 nm is used as the second light flux, the value is greatly shifted from the peak value of the wavefront and the high diffraction efficiency is hardly obtained. Namely, in an optical pickup apparatus which compatibly works by using first order, minus first order and minus second order diffracted light, an objective lens including five-step first optical path difference providing structure in which the widths of steps are uniform is not applicable to the practical use.

Next, a first optical path difference providing structure shown in FIG. 3b as a Comparative example 2 has diffraction characteristics shown in FIG. 4b. More concretely, the first order diffracted light of the first wavelength has a peak value around 405 nm, the minus first order diffracted light of the second wavelength has a peak value around 650 nm, and the minus second order diffracted light of the third wavelength has a peak value at extremely large wavelength over 800 nm. Accordingly, when a light flux with a wavelength around 405 nm is used as the first light flux, and when a light flux with a wavelength around 655 nm is used as the second light flux, the diffraction efficiencies each having a value close to the peak value of the wave form can be obtained. When a light flux with a wavelength around 785 nm is used as the third light flux, the value is greatly shifted from the peak value of the wavefront and the high diffraction efficiency is hardly obtained. Herein, as for a CD, the diffraction efficiency of the minus first order diffracted light (about 31%) is higher than the diffraction efficiency of the minus second order diffracted light (about 19%), but both of them are not sufficient diffraction efficiencies. Namely, in an optical pickup apparatus which compatibly works by using first order, minus first order and minus second order (or minus first order) diffracted light, an objective lens including a four-step first optical path difference providing structure is not applicable to the practical use, too.

On the other hand, the first optical path difference providing structure shown in FIG. 3c relating to the present invention, has diffraction characteristics as shown in FIG. 4c. More concretely, the first order diffracted light of the first wavelength has a peak value around 405 nm, the minus first order diffracted light of the second wavelength has a peak value around 600 nm, and the minus second order diffracted light of the third wavelength has a peak value around 800 nm. Accordingly, high diffraction efficiencies can be obtained in an excellent balanced condition any cases when a light flux with a wavelength around 405 nm is used as the first light flux, which is needless to say, when a light flux with a wavelength around 655 nm is used as the second flux, and when a light flux with a wavelength around 785 nm is used as the third light flux. Namely, in an optical pickup apparatus which compatibly works by using first order, minus first order and minus second order diffracted light fluxes, especially high diffraction efficiencies can be obtained in an excellent balanced condition, and an objective lens including the first optical path difference providing structure of the present invention is especially applicable to the practical use.

The above-described results are shown in Table 1.

TABLE 1

|  | BD | DVD | CD |
|---|---|---|---|
| Wavelength | 405 nm | 655 nm | 785 nm |
| Five steps | 88% | 48% | 57% |
| Four steps | 81% | 81% | 31% |
| Present invention | 85% | 66% | 49% |

The objective lens described in item 6 is characterized in that, according to the invention of any one of items 1 to 4, the first optical path difference providing structure is an optical path difference providing structure that makes an amount of first-order diffracted light of the first light flux which has passed through the first optical path difference providing structure larger than amounts of diffracted light of any other orders (including a zero-th order), makes an amount of minus-second-order diffracted light of the second light flux which has passed through the first optical path difference providing structure larger than amounts of diffracted light of any other orders (including a zero-th order), and makes an amount of minus-third-order diffracted light of the third light flux which has passed through the first optical path difference providing structure larger than amounts of diffracted light of any other orders (including a zero-th order).

With referring to the drawings, a principal of the present invention is described. Each of FIGS. 11a, 11b and 11c is a sectional view of a step type of a first optical path difference providing structure generating diffracted light relating to claim 6, obtained by cutting the first optical path difference providing structure along a plane including the optical axis. Each of FIGS. 12a, 12b, and 12c is a diagram showing diffraction efficiencies of respective wavelengths, where the vertical axis represents the diffraction efficiencies and the horizontal axis represents a wavelength. Herein, it is described under the assumption that the first optical path difference providing structure is formed on a plane surface for an easy understanding.

In FIGS. 11a, 11b and 11c, there is provided a first optical path difference providing structure being a step structure in which step units SU each having the same number of steps are periodically repeated (are formed concentrically around the optical axis as the center). Examples of FIGS. 11a and 11c show steps S1 to S7, where the number of steps is seven, S7 is the highest step and S1 is the lowest step. Neighboring steps are connected with each other through a step difference extending along the direction of the optical axis. The example of Fig. 11b shows steps S1 to S6, where the number of steps is six, S6 is the highest step, and S1 is the lowest step. Neighboring steps are similarly connected with each other through a step difference extending by the same amount to the others along the direction of the optical axis.

First, the first optical path difference providing structure shown in FIG. 11a as Comparative example 1 has diffraction characteristics as shown in FIG. 12a. More concretely, the first order diffracted light of the first wavelength has a peak value around 405 nm, the minus second order diffracted light of the second wavelength has a peak value around 630 nm, and the minus third order diffracted light of the third wavelength has a peak value around 785 nm. Accordingly, when a light flux with a wavelength around 405 nm is used as the first light flux, and when a light flux with a wavelength around 785 nm is used as third light flux, the diffraction efficiencies each having a value close to the peak value of the wave form can be obtained. When a light flux with a wavelength around 655 nm is used as the second light flux, the value is greatly shifted from the peak value of the wavefront and the high diffraction efficiency is hardly obtained. Namely, in an optical pickup apparatus which compatibly works by using first order, minus second order and minus third order diffracted light fluxes, an objective lens including seven-step first optical path difference providing structure in which the widths of steps are uniform is not applicable to the practical use.

Next, a first optical path difference providing structure shown in FIG. 11b as a Comparative example 2 has diffraction characteristics shown in FIG. 12b. More concretely, the first order diffracted light of the first wavelength has a peak value around 405 nm, the minus second order diffracted light of the second wavelength has a peak value around 680 nm, and the minus third order diffracted light of the third wavelength has a peak value at extremely large wavelength over 800 nm. Accordingly, when a light flux with a wavelength around 405 nm is used as the first Tight flux, and when a light flux with a wavelength around 655 nm is used as the second light flux, the diffraction efficiencies each having a value close to the peak value of the wave form can be obtained. When a light flux with a wavelength around 785 nm is used as the third light flux, the value is greatly shifted from the peak value of the wavefront and the high diffraction efficiency is hardly obtained. Namely, in an optical pickup apparatus which compatibly works by using first order, minus second order and minus third order diffracted light, an objective lens including a six-step first optical path difference providing structure in which the widths of steps are uniform is not applicable to the practical use, too.

On the other hand, the first optical path difference providing structure shown in FIG. 11c relating to the present invention has diffraction characteristics as shown in FIG. 12c.

More concretely, the first order diffracted light of the first wavelength has a peak value around 405 nm, the minus second order diffracted light of the second wavelength has a peak value around 640 nm, and the minus third order diffracted light of the third wavelength has a peak value around 800 nm. Accordingly, high diffraction efficiencies can be obtained in an excellent balanced condition any cases when a light flux with a wavelength around 405 nm is used as the first light flux, which is needless to say, when a light flux with a wavelength around 655 nm is used as the second flux, and when a light flux with a wavelength around 785 nm is used as the third light flux. Namely, in an optical pickup apparatus which compatibly works by using first order, minus second order and minus third order diffracted light fluxes, especially high diffraction efficiencies can be obtained in an excellent balanced condition, and an objective lens including the first optical path difference providing structure of the present invention is especially applicable to the practical use.

The above-described results are shown in Table 2.

TABLE 2

|  | BD | DVD | CD |
|---|---|---|---|
| Wavelength | 405 nm | 655 nm | 785 nm |
| Seven steps | 93% | 61% | 52% |
| Six steps | 91% | 63% | 20% |
| Present invention | 92% | 72% | 45% |

The objective lens described in item 7 is characterized in that, according to the invention of any one of items 1 to 6, the one of the highest step and the lowest step satisfies the following relational expression:

$$0.4\, w2 < w1 < 0.6\, w2 \quad (2)$$

More preferably, $w1 = 0.5\, w2$ holds.

The objective lens described in item 8 is characterized in that, according to the invention of any one of items 1 to 7, amounts of step differences in a direction of the optical axis are almost same to each other, where each of the step differences is formed between neighboring steps in the step units.

The objective lens described in item 9 is characterized in that, according to the invention of any one of items 1 to 8, widths in a perpendicular direction to the optical axis of the steps excluding the one of the highest step and the lowest step satisfying the expression (1) are uniform in terms of a function.

The objective lens of item 10 is characterized in that, according to the invention of any one of items 1 to 8, in one of the step units, widths in a perpendicular direction to the optical axis of the steps excluding the one of the highest step and the lowest step satisfying the expression (1) are almost same to each other.

An optical pickup apparatus described in item 11 comprising an objective lens for forming a converged spot on an information recording surface of a first optical disc including a protective layer with a thickness t1 by using a first light flux with a wavelength $\lambda 1$ emitted from a first light source, for forming a converged spot on an information recording surface of a second optical disc including a protective layer with a thickness t2 (t1<t2) by using a second light flux with a wavelength $\lambda 2 (\lambda 1 < \lambda 2)$ emitted from a second light source, and for forming a converged spot on an information recording surface of a third optical disc including a protective layer with a thickness t3 (t2 <t3) by using a third light flux with a wavelength $\lambda 3 (\lambda 2 < \lambda 3)$ emitted from a third light source, the optical pickup apparatus characterized in that an optical surface of the objective lens comprises a first optical path difference providing structure which is a step structure in which a plurality of ring-shaped step units each including same number of steps are arranged concentrically about an optical axis as a center, and a width w1 which is a width in a perpendicular direction to the optical axis of one of a highest step and a lowest step of at least one of the step units, and an average value w2 which is an average of two steps arranged at both sides of the one of the highest step and the lowest step along a direction perpendicular to the optical axis satisfy the following relational expression:

$$0.2\, w2 < w1 < 0.8\, w2 \quad (1)$$

The optical pickup apparatus described in item 12 is characterized in that, according to the invention of item 11, in all the step units in the step structure, one of the highest step and the lowest step satisfy the expression (1).

The optical pickup apparatus described in item 13 is characterized in that, according to the invention of item 11 or 12, the optical surface of the objective lens comprises at least a central area including the optical axis, a peripheral area in a ring shape formed around the central area, and a most peripheral area in a ring shape formed around the peripheral area, the first light flux which has passed through the central area, the peripheral area, and the most peripheral area is converged so that information can be recorded and/or reproduced on the information recording surface of the fast optical disc, the second light flux which has passed through the central area and the peripheral area is converged so that information can be recorded and/or reproduced on the information recording surface of the second optical disc, and the second light flux which has passed through the most peripheral area is not converged so that information can be recorded and/or reproduced on the information recording surface of the second optical disc the third light flux which has passed through the central area is converged so that information can be recorded and/or reproduced on the information recording surface of the third optical disc, and the third light flux which has passed through the peripheral area and the most peripheral area is not converged so that information can be recorded and/or reproduced on the information recording surface of the third optical disc, and the first optical path difference providing structure is formed in the central area.

The optical pickup apparatus described in claim 14 is characterized in that, according to the invention of any one of claims 11 to 13, only the lowest step satisfies the expression (1).

The optical pickup apparatus described in item 15 characterized in that, according to the invention of any one of items 11 to 14, the first optical path difference providing structure is an optical path difference providing structure that makes an amount of first-order diffracted light of the first light flux which has passed through the first optical path difference providing structure larger than amounts of diffracted light of any other orders (including a zero-th order), makes an amount of minus-first-order diffracted light of the second light flux which has passed through the first optical path difference providing structure larger than amounts of diffracted light of any other orders (including a zero-th order), and makes an amount of minus-second-order diffracted light of the third light flux which has passed through the first optical path difference providing structure larger than amounts of diffracted light of any other orders (including a zero-th order).

The optical pickup apparatus described in item 16 is characterized in that, according to the invention of any one of items 11 to 14, the first optical path difference providing structure is an optical path difference providing structure that makes an amount of first-order diffracted light of the first light flux which has passed through the first optical path difference providing structure larger than amounts of diffracted light of any other orders (including a zero-th order), makes an amount of minus-second-order diffracted light of the second light flux which has passed through the first optical path difference providing structure larger than amounts of diffracted light of any other orders (including a zero-th order), and makes an amount of minus-third-order diffracted light of the third light flux which has passed through the first optical path difference providing structure larger than amounts of diffracted light of any other orders (including a zero-th order).

The optical pickup apparatus described in item 17 is characterized in that, according to the invention of any one of items 11 to 16, the one of the highest step and the lowest step satisfies the following relational expression:

$$0.4 \, w2 < w1 < 0.6 \, w2 \tag{2}$$

The optical pickup apparatus described in item 18 is characterized in that, according to the invention of any one of items 11 to 17, amounts of step differences in a direction of the optical axis are almost same to each other, where each of the step differences is formed between neighboring steps in the step units.

The optical pickup apparatus described in claim item 19 is characterized in that, according to the invention of any one of claims item 11 to 18, widths in a perpendicular direction to the optical axis of the steps excluding the one of the highest step and the lowest step satisfying the expression (1) are uniform in terms of a function.

The optical pickup apparatus described in item 20 is characterized in that, according to the invention of any one of items 11 to 18, in one of the step units, widths in a direction perpendicular to the optical axis of the steps excluding the one of the highest step and the lowest step satisfying the expression (1) are almost same to each other.

An optical pickup apparatus according to the present invention comprises at least three light sources: a first light source, a second light source, and a third light source. The optical pickup apparatus further comprises a light-converging optical system for converging the first light flux on the information recording surface of the first optical disc, converging the second light flux on the information recording surface of the second optical disc, and converging the third light flux on the information recording surface of the third optical disc. The optical pickup apparatus according to the present invention further comprises a light-receiving element for receiving each of reflection light fluxes from the information recording surfaces of the first optical disc, the second optical disc, and the third optical disc. Herein, it is preferable that the first optical disc is a BD (Blu-ray Disc) or HD DVD (referred as HD), the second optical disc is a DVD, and the third optical disc is a CD. However, the discs are not limited to those. Each of the first optical disc, the second optical disc, and the third optical disc may be a multilayered optical disc including plural information recording layers.

As for a BD, information is recorded and/or reproduced with an objective lens with NA of 0.85, and it has a protective layer with a thickness about 0.1 mm. As for a HD, information is recorded and/or reproduced with an objective lens with NA of 0.65 to 0.67, and it has a protective layer with a thickness about 0.6 mm. A DVD represents a generic name of optical discs wherein information is recorded and/or reproduced with an objective lens with NA of 0.60 to 0.67 and a protective layer has a thickness about 0.6 mm, and involves DVD-ROM, DVD-Video, DVD-Audio, DVD-RAM, DVD-R, DVD-RW, DVD+R and DVD+RW. In the present specification, a CD represents a genetic name of optical discs wherein information is recorded and/or reproduced by an objective lens with NA in the range of 0.45 to 0.53 and the protective layer has the thickness about 1.2 mm, and involves CD-ROM, CD-Audio, CD-Video, CDR and CD-RW. As for a recording density, a BD has the highest recording density, and a HD, DVD and CD have lower recording densities in this order.

Thicknesses t1, t2, and t3 of the protective substrates preferably satisfy the following conditional expressions (3), (4), and (5). However, the thicknesses are not limited to them.

$$0.05 \text{ mm} \leq t1 \leq 0.11 \text{ mm or } 0.5 \text{ mm} \leq t1 \leq 0.7 \text{ mm} \tag{3}$$

$$0.5 \text{ mm} \leq t2 \leq 0.7 \text{ mm} \tag{4}$$

$$1.0 \text{ mm} \leq t3 \leq 1.3 \text{ mm} \tag{5}$$

In the present specification, each of the first light source, the second light source, and the third light source is preferably a laser light source. Lasers such that a semiconductor laser, and a silicon laser are preferably used for the laser light source. The first wavelength 2.1 of the first light flux emitted from the first light source, the second wavelength $\lambda 2$ ($\lambda 2 > \lambda 1$) of the second light flux emitted from the second light source, the third wavelength $\lambda 3$ ($\lambda 3 > \lambda 2$) of the third light flux emitted from the third light source, are preferable to satisfy the following conditional expressions (6) and (7).

$$1.5 \times \lambda 1 < \lambda 2 < 1.7 \times \lambda 1 \tag{6}$$

$$1.9 \times \lambda 1 < \lambda 3 < 2.1 \times \lambda 1 \tag{7}$$

When a BD or HD, DVD, and CD are employed as the first optical disc, the second optical disc, and the third optical disc, respectively, the wavelength $\lambda 1$ of the first light source is preferably 350 nm or more, and 440 nm or less, and is more preferably 380 nm or more, and 415 nm or less; the second wavelength $\lambda 2$ of the second light source is preferably 570 nm or more, and 680 nm or less, and is more preferably 630 nm or more, and 670 nm or less; and the third wavelength $\lambda 3$ of the third light source is preferably 750 nm or more, and 880 nm or less, and is more preferably 760 nm or more, and 820 nm or less.

Further, at least two light sources of the first light source, the second light source, and the third light source may be unitized. The unitization means fixing and housing, for example, the first light source and the second light source into one package. However it is not limited to the above, the unitization in a broad sense involves a situation that two light sources are fixed so that aberration can not be corrected. Further, in addition to the light source, the light-receiving element which will be described later, may also be provided as one package.

As the light-receiving element, a photo detector such as a photo diode is preferably used. The light reflected on the information recording surface of the optical disc enters into the light-receiving element, and signal outputted from the light-receiving element is used for obtaining the read signal of the information recorded in each optical disc. Further, a change in the light amount caused with a change in shape and a change in position of the spot on the light-receiving element, are detected to conduct the focus detection and the tracking detection focus detection. Based on these detections, the objective lens can be moved for focusing and tracking operations. The light-receiving element may be composed of a plurality of photo detectors. The light-receiving element may also have a main photo detector and secondary photo detector. For example, the light-receiving element is provided with a main photo detector which receives the main light used for recording and/or reproducing information, and two secondary photo detectors positioned on both sides of the main photo detector, so as to receive secondary light for tracking adjustment by the two secondary photo detectors. Further, the light-receiving element may also comprise a plurality of light-receiving elements corresponding to respective light sources.

The light-converging optical system comprises an objective lens. The light-converging optical system may comprise only an objective lens, however, the light-converging optical system may further comprise a coupling lens such as a collimator lens other than the objective lens. The coupling lens is arranged between the objective lens and the light source and means a single lens or a lens group which changes divergent angle of a light flux. The collimation lens is a kind of coupling lens and is a lens to collimate a light flux which has enter the collimation lens. Further, the light-converging optical system may also comprise an optical element such as a diffractive optical element which divides a light flux emitted from a light source into a main light flux used for recording reproducing information and two secondary light fluxes used for operations such as a tracking operation. In the present specification, an objective lens means an optical system which is arranged to face an optical disc in an optical pickup apparatus, which has a function to converge a light flux emitted from a light source onto an information recording surface of the optical disc. Preferably, the objective lens is an optical system which is arranged to face an optical disc in an optical pickup apparatus, and which has a function to converge a light flux emitted from a light source on an information recording surface of the optical disc, and further which is movable as one body in the direction of at least the optical axis by an actuator. The objective lens is preferable an objective lens formed of one lens, but may be fanned of a plurality of lenses and/or optical elements. The objective lens may be a glass lens, a plastic lens or a hybrid lens in which an optical path difference providing structure is formed on the glass lens by using thermosetting resin. The objective lens may comprise a refractive surface which is an aspheric surface. Further, the objective lens preferably has an aspheric base surface on which an optical path difference providing structure is provided.

Further, when the objective optical element is a glass lens, it is preferable that a glass material with a transition point Tg of 400° C. or less is used By using the glass material whose glass transition point Tg is 400° C. or less, the material can be molded at a comparatively low temperature. Therefore, the life of the mold can be prolonged. As an example of the glass material whose glass transition point Tg is low, there are K-PG325 and K-PG375 (both are trade names) made by SUMITA Optical glass, Inc.

Hereupon, a glass lens has generally larger specific gravity than a resin lens. Therefore, the objective lens made of glass has larger weight and applies a larger burden to an actuator which drives the objective lens. Therefore, when a glass lens is employed for the objective lens, a glass material having small specific gravity is preferably used for the objective lens. Specifically, the specific gravity is preferably 3.0 or less, and is more preferably 2.8 or less.

Further, when a plastic lens is employed for the objective lens, it is preferable that a resin material of cyclic olefins is used for the objective lens. In the cyclic olefins, there is more preferably used the resin material having: a refractive index at the temperature 25° C. for wavelength 405 nm, which is within the range of 1.52 to 1.60; and a ratio of refractive index change dN/dT ($°C^{-1}$) caused by a temperature change within the temperature range of −5° C. to 70° C. for the wavelength 405 nm, which is within the range of $-20\times10^{-5}$ to $-5\times10^{-5}$ (more preferably, $-10\times10^{-5}$ to $-8\times10^{-5}$). Further, when a plastic lens is employed for the objective lens, it is preferable that a plastic lens is also employed for the coupling lens.

The objective lens will be described below. At least one optical surface of the objective lens comprises a central area and a peripheral area around the central area. At least one optical surface of the objective lens may further comprise a most peripheral area around the peripheral area. The central area preferably is an area including the optical axis of the objective lens, however, it may also be an area not including the optical axis. It is preferable that the central area, peripheral area, and most peripheral area are provided on the same optical surface. As shown in FIG. 5, it is preferable that the central area CN, peripheral area MD, most peripheral area OT are provided on the same optical surface concentrically around the optical axis as the center. It is preferable that each of the central area, peripheral area, and most peripheral area adjoins to the neighboring area, however, there may be slight gaps between them.

The objective lens comprises a first optical path difference providing structure. The first optical path difference providing structure is preferably provided in the central area of the objective lens. The second optical path difference providing structure may be provided in the peripheral area When the most peripheral area is provided, the most peripheral area may be a refractive surface, or a third optical path difference providing structure may be provided in the most peripheral area.

The area where the first optical path difference providing structure is provided is preferably 70% or more of the area of the central area on the objective lens. It is more preferably 90% or more of the area of the central area. The first optical path difference providing structure is furthermore preferably provided on the entire surface of the central area. The area where the second optical path difference providing structure is provided is preferably 70% or more of the peripheral area on the objective lens. It is more preferably 90% or more of the area of the peripheral area. The second optical path difference providing structure is further more preferably provided on the entire surface of the peripheral area. The area where the third optical path difference providing structure is provided, is 70% or more of the area of the most peripheral area on the objective lens. It is more preferably 90% or more of the area of the most peripheral area. The third optical path difference providing structure is more preferably provided on the entire surface of the most peripheral area.

Further, when a second optical path difference providing structure is arranged in a peripheral area of the objective lens, additionally to the first optical path difference providing structure arranged in the central area of the objective lens, they can be arranged on the different optical surfaces but they are preferably arranged on the same optical surface. By arranging them on the same optical surface, decentration error caused in a manufacturing process can be reduced, which is preferable. The first optical path difference providing structure and the second optical path difference providing structure are preferably arranged on the surface of the objective lens facing the light source rather than the surface of the objective lens facing the optical disc. From another view point, the first optical path difference providing structure and the second optical path difference providing structure are preferably arranged on the surface with smaller curvature radius among the opposing two optical surfaces of the objective lens.

The objective lens converges each of the first light flux, the second light flux and the third light flux passing through the central area on which the first optical path difference providing structure is formed, on the objective lens, to form a converged spot. Preferably, the objective lens converges the first light flux passing through the central area on which the first optical path difference providing structure, on the objective lens, such that information can be recorded and/or reproduced on the information recording surface of the first optical disc. The objective lens converges the second light flux passing through the central area on which the first optical path difference providing structure is formed, on the objective lens, such that information can be recorded and/or reproduced on the information recording surface of the second optical disc. The objective lens converges the third light flux passing through the central area on which the first optical path difference providing structure is formed, on the objective lens, such that information can be recorded and/or reproduced on the information recording surface of the third optical disc. When the thickness t1 of the protective layer of the first optical disc and the thickness t2 of the protective layer of the second optical disc are different from each other, the first optical path difference providing structure preferably corrects the first light flux and the second light flux which pass through the first optical path difference providing structure, in terms of spherical aberration caused by a difference of the thickness t1 of the protective substrate of the first optical disc and the thickness t2 of the protective substrate of the second optical disc and/or spherical aberration caused by a difference in the wavelength between the first light flux and the second light flux. Further, the first optical path difference providing structure preferably corrects the first light flux and the third light flux which pass through the first optical path difference providing structure, in terms of spherical aberration caused by a difference of the thickness t1 of the protective substrate of the first optical disc and the thickness t3 of the protective substrate of the third optical disc and/or spherical aberration caused by a difference in the wavelength between the first light flux and the third light flux.

When the second optical path difference providing structure is arranged on the objective lens, the objective lens converges each of the first light flux and the second light flux passing through the peripheral area by using itself, to form a converged spot. Preferably, the objective lens converges the first light flux passing through the peripheral area on which the second optical path difference providing structure is formed, on the objective lens, such that information can be recorded and/or reproduced on the information recording surface of the first optical disc. When the second optical path difference providing structure is arranged on the objective lens, the objective lens converges the second light flux passing through the central area on which the second optical path difference providing structure is formed, on the objective lens, such that information can be recorded and/or reproduced on the information recording surface of the second optical disc. Further, the second optical path difference providing structure preferably corrects chromatic spherical aberration caused by a difference in the wavelength between the first light flux and the second light flux.

As a preferred embodiment, there is cited an embodiment wherein the third light flux which has passed through the peripheral area, is not used for recording and/or reproducing information for the third optical disc. It is preferable to prepare the embodiment such that the third light flux which has passed through the peripheral area does not contribute toward forming a converged spot on the information recording surface of the third optical disc. In other words, when the second optical path difference providing structure is arranged on the objective lens, thereby, the third light flux which has passed through the peripheral area is preferably formed into flare light on the information recording surface of the third optical disc. As shown in FIG. 6, in a spot formed on an information recording surface of the third optical disc by the third light flux which has passed through the objective lens, there are preferably provided, in order from the optical-axis side (or from the central portion of the spot), central spot portion SCN with the largest density of a light amount, intermediate spot portion SMD with a density of a light amount being smaller than that of the central spot portion, and peripheral spot portion SOT with a density of a light amount being larger than that of the intermediate spot portion and being smaller than that of the central spot portion. The central spot portion is used for recording and/or reproducing information on an optical disc, and the intermediate spot portion and the peripheral spot portion are not used for recording and/or reproducing information on an optical disc. In the above descriptions, the peripheral spot portion is described as flare light. In other words, the third light flux which has passed through the second optical path difference providing structure arranged on the peripheral area of the objective lens preferably forms a peripheral spot portion on an information recording surface of the third optical disc. However, other than the above-described flare light, there can be formed a peripheral spot portion around the central spot portion with a large density of light amount without an intermediate spot portion being formed, wherein a density of a light amount of the peripheral spot portion is smaller than that of the central spot portion. In this case, the peripheral spot portion is referred as flare light. Such the peripheral spot portion may be fanned on an information recording surface of the third optical disc by the third light flux which has passed through the second optical path difference providing structure formed on the peripheral area of the objective lens.

As a preferred embodiment of a case where there is provided a most peripheral area, there can be cited an embodiment that the first light flux which has passed through the most peripheral area is used for recording and/or reproducing information for the first optical disc, and that the second light flux and the third light flux which have passed through the most peripheral area is not used for recording and/or reproducing information for the second optical disc and the third optical disc. It is preferable to prepare the embodiment such that the second light flux and the third light flux which have passed through the most peripheral area do not contribute toward forming a converged spot on the information recording surface of the second optical disc and the third optical disc. In other words, when the objective lens includes the most peripheral area, each of the second light flux and the third light flux which have passed through the most peripheral area of the objective lens is preferably formed into flare light on the information recording surface of the second optical disc and the third optical disc.

An optical path difference providing structure used in the present specification, is a general name of the structure by which an optical path difference is provided to an incident light flux. An optical path difference providing structure also involves a phase difference providing structure by which a phase difference is provided. Further, a phase difference providing structure involves a diffractive structure. The optical path difference providing structure is preferably a diffractive structure. The optical path difference providing structure comprises a step, preferably, has a plurality of steps. This step provides an optical path difference and/or phase difference to an incident light flux. The optical path difference added by the optical path difference providing structure may also be an integer multiple of the wavelength of the incident light flux, or may also be non-integer multiple of the wavelength of the incident light flux. The step may also be arranged with periodic interval in the direction perpendicular to the optical axis, or may also be arranged with non-periodic interval in the direction perpendicular to the optical axis.

It is preferable that the optical path difference providing structure includes a plurality of ring-shaped zones arranged concentrically around the optical axis as a center. Further, the optical path difference providing structure can have various sectional shapes (sectional shapes in the plane including the optical axis). Especially, the first optical path difference providing structure preferably has a structure whose shape in the cross section on a plane including the optical axis has a step structure. A step structure means that, as shown in FIG. 7, an optical element including an optical path difference providing structure has a step shape in a cross section including the optical axis, and has a structure in which a plurality of step units each including the same number of steps are arranged concentrically around the optical axis as the center. As another explanation, it means that the optical path difference providing structure includes only surfaces being parallel with its base surface and surfaces being parallel with the optical axis and includes no inclined surface against the base surface.

The step units are preferably repeated periodically. The expression "repeated periodically" in the present description naturally involves a shape in which the same step units are repeated on the constant cycle. Further, bodies "repeated periodically" also involve a shape such that a step unit provided as one unit of the cycle changes regularly such that its cycle is gradually elongated or shortened.

Concretely, a step structure can have a shape such that small-step shapes having the same shape and composed of several steps are repeated as shown in FIG. 7 (wherein the shape of FIG. 7 is sometimes referred as a step structure with five-divided sections). Further, it can have a shape that the size of steps becomes gradually larger toward the base surface, or a shape that the size of steps become gradually smaller toward the base surface. In these shapes, it is preferable that the lengths along the optical axis direction (or a direction of a passing light flux), namely, amounts of the step differences of steps almost do not change. In FIG. 7, a surface extending along the perpendicular direction of the optical axis is referred as a step. In one step unit SU, the step arranged at the highest position, namely, the step arranged at the closest position to the light source (in other words, the step at a portion where the objective lens has the largest thickness) is referred as the highest step HS. The step arranged at the lowest position, namely, the step arranged at the closest position to the optical disc (in other words, the step at a portion where the objective lens has the smallest thickness) is referred as the lowest step LS. A surface extending between neighboring steps along the optical axis direction is referred as a step difference. The length of the step difference along the optical axis is referred as an amount of step difference. Accordingly, the step unit of the step structure with five-divided sections shown in FIG. 7 has five steps including the highest step HS and the lowest step LS, and has four small step differences SW and one large step difference LW.

In at least one step unit in a step structure of the first optical path difference providing structure, a width w1 in a perpendicular direction to the optical axis of one of a highest step and a lowest step of at least one of the step units, and an average value w2 of two steps arranged at both sides of the one of the highest step and the lowest step along a direction perpendicular to the optical axis satisfy the following relational expression:

$$0.2\, w2 \leq w1 \leq 0.8\, w2 \tag{1}$$

More preferably, the following conditional expression is satisfied. When the following expression:

$$0.4\, w2 \leq w1 \leq 0.6\, w2 \tag{2}$$

is satisfied, the efficiency for a CD is not excessively decreased, while the efficiency for a DVD is enhanced. It realizes a structure with well-balanced efficiencies, which is preferable.

More preferably, w1=0.5 w2 holds.

There can be just one step which neighbors to the highest step or the lowest step. In this case, w2 is defined to be the width of the one neighboring step, measured along the perpendicular direction to the optical axis.

For example, FIG. 1b shows a sectional view obtained by cutting the step type of first optical path difference providing structure relating to an example of the present invention along a plane including the optical axis. In this example, there are provided five steps including steps S1 to S5, where S5 is the highest step and S1 is the lowest step. The neighboring steps are connected to each other through a step difference extending along the direction of the optical axis and having the same amount of step difference to the others. The widths along the perpendicular direction to the optical axis of steps S1, S2, S3, and S4 other than the highest step S5 is elongated, and the width along the perpendicular direction to the optical axis of the highest step S5 is shortened so as to satisfy the expression (1). Herein, the value of w2 is calculated by (wB+wA)/2. In this example, w1=0.5 w2 holds. However the present expression shows an example that the highest step satisfies the conditional expression (1) of the present invention, the lowest step may satisfy the conditional expression (1) of the present invention, alternatively. It is preferable that just one of the highest step and the lowest step satisfies the conditional expression of the present invention, and it is not preferable that both of the highest step and the lowest step satisfy the conditional expression (1) of the present invention. In other words, it is preferable that only one step satisfies the conditional expression (1) in one step unit.

Further, when the above conditional expression (1) is satisfied in at least one step unit, a certain extent of the effect of the present invention can be obtained. However, in order to obtain the effect of the present invention more significantly, it is preferable that eight tenths or more of step units in the first optical path difference providing structure satisfy the above conditional expression (1). It is more preferable that all the step units in the first optical path difference providing structure satisfy the above conditional expression (1).

Considering about the case that only the highest steps satisfy the expression (1) and the case that only the lowest steps satisfy the expression (1), it is preferable that only the lowest steps satisfy the expression (1). The reason is that, when the objective lens is formed with a mold, the material of the objective lens easily enters in to an inner part of the mold due to the widened width of the highest step. Thereby, transferability is enhanced and a problem of manufacturing errors can be reduced. As a result, loss of the light amount can be reduced and the light utilization efficiency is enhanced, which is preferable.

It is preferable that the amounts of all the step differences each formed between neighboring steps in one step unit are almost the same to each other, which makes designing process easy because it is enough to change only the widths of steps without changing the amounts of step differences, in a designing step of a lens. Herein, the expression "the amount of step difference A and the amount of step difference B are almost the same to each other" means that $0.9A \leq B \leq 1.1A$ holds. It is preferable that every step unit satisfies the expression that "it is preferable that the amounts of all the step differences each formed between neighboring steps are almost the same to each other in one step unit". It is more preferable that the amounts of all the step differences each formed between neighboring steps are almost the same to the others in all the step units.

It is preferable that, in one step unit, width in the perpendicular direction to the optical axis of steps excluding the highest step or the lowest step satisfying the expression (1) are uniform in terms of a function. The expression "uniform in terms of a function" means that, when an optical path difference provided by an optical path difference providing structure is represented by an integer multiple of an optical path difference function (a function represented by Math 2 which will be described later), the widths are set to provide an uniform optical path difference based on the integer multiple of an optical path difference function. An example is described with referring to FIG. 10. Widths of all the steps excluding the highest step or the lowest step are determined so as to provide the same optical path difference corresponding to 2λbased on an optical path difference calculated by multiplying an optical path difference function by nine. Thereby, the widths are determined to be uniform in terms of a function. As a result, it is preferable that steps other than the highest step or the lowest step satisfying the expression (1) have the almost same widths in the perpendicular direction to the optical axis to each other, in one step unit. Herein, "width C of a certain step and width D of another certain step are almost the same" means that $09 C \leq D \leq 1.1 C$ holds.

The first optical path difference providing structure preferably makes the amount of the first-order diffracted light of the first light flux which has passed through the first optical path difference providing structure, larger than the amounts of diffracted light of any other orders (including a zero-th order). The first optical path difference providing structure preferably makes the amount of the minus-first-order diffracted light of the second light flux larger than the amounts of diffracted light of any other orders (including a zero-th order), and preferably makes the amount of the minus-second-order diffracted light of the third light flux larger than the amounts of diffracted light of any other orders (including a zero-th order).

It is preferable that the first optical path difference providing structure exhibiting the combination of above diffraction orders employs a step unit with five steps and satisfy the following conditional expression:

$$1.18 \cdot \lambda 1/(n-1) < d1 < 1.30 \cdot \lambda 1/(n-1).$$

High diffraction efficiencies in a well-balanced condition can be obtained especially in an objective lens and an optical pickup which realize compatibility by using the first order for the first light flux, a minus first order for the second light flux, and the minus second order for the third light flux, and an effect obtained when the highest step or the lowest step of the first optical path difference providing structure satisfies the expression (1) becomes significant.

Further, there can be cited another preferred example of the first optical path difference providing structure other than above. The first optical path difference providing structure preferably makes the amount of the first-order diffracted light of the first light flux which has passed through the first optical path difference providing structure, larger than the amounts of diffracted light of any other orders (including a zero-th order). The first optical path difference providing structure preferably makes the amount of the minus-second-order diffracted light of the second light flux larger than the amounts of diffracted light of any other orders (including a zero-th order), and preferably makes the amount of the minus-third-order diffracted light of the third light flux larger than the amounts of diffracted light of any other orders (including a zero-th order).

It is preferable that the first optical path difference providing structure exhibiting the combination of above diffraction orders employs a step unit with seven steps and satisfy the following conditional expression:

$$1.10 \cdot \lambda 1/(n-1) < d1 < 1.22 \cdot \lambda 1/(n-1).$$

High diffraction efficiencies in a well-balanced condition can be obtained especially in an objective lens and an optical pickup which realize compatibility by using the first order for the first light flux, a minus second order for the second light flux, and the minus third order for the third light flux, and an effect obtained when the highest step or the lowest step of the first optical path difference providing structure satisfies the expression (1) becomes significant.

When the most peripheral area includes a third optical path difference providing structure, the third optical path difference providing structure may correct the first light flux which has passed through the third optical path difference providing structure in terms of a spherochromatism (chromatic spherical aberration) caused due to the slightly fluctuating wavelength of the first light source. The slight fluctuation of the wavelength means the fluctuation within ±10 nm. For example, when the first light flux changes by ±5 nm from the wavelength λ1, it is preferable that the third optical path difference providing structure corrects the fluctuation of the spherical aberration of the first light flux passing through the most peripheral area and the amount of the fluctuation of the spherical aberration on the information recording surface of the first optical disc is 0.001 λ2 rms or more, and is 0.070 λ2 rms or less.

NA1 represents the image side numerical aperture of the objective lens, necessary for reproducing and/or recording information for the first optical disc. NA2 (NA1≧NA2) represents that the image side numerical aperture of the objective lens necessary for reproducing and/or recording for the information to the second optical disc. NA3 (NA2>NA3) represents that the image side numerical aperture of the objective lens necessary for reproducing and/or recording information for the third optical disc. NA1 is preferably 0.6 or more, and 09 or less. Especially, NA1 is more preferably from 0.8 to 0.9. NA2 is preferably 0.55 or more, and is 0.7 or less. Especially, NA2 is more preferably from 0.60 or 0.65. NA3 is preferably 0.4 or more, and is 0.55 or less. Especially, NA3 is more preferably 0.45 or 0.53. Further, numerical apertures under a standard necessary for recording and/or reproducing information for the first optical disc, the second optical disc, and the third optical disc are preferably within the above ranges of NA1, NA2, and NA3.

It is preferable that the border of the central area and the peripheral area in the objective lens is formed in a portion corresponding to the range being 0.9·NA3 or more and being 1.2·NA3 or less (more preferably, 0.95·NA3 or more, and 1.15·NA3 or less) under the condition that the third light flux is used. More preferably, the border of the central area and the peripheral area of the objective lens is formed in a portion corresponding to NA3. Further, it is preferable that the border of the peripheral area and the most peripheral area of the objective lens is formed in a portion corresponding to the range being 0.9·NA2 or more, and being 1.2·NA2 or less (more preferably, being 0.95·NA2 or more, and being 1.15·NA2 or less) for the second light flux. More preferably, the border of the peripheral area and the most peripheral area of the objective lens is formed in a portion corresponding to NA2. It is preferable that the border of the outside of the most peripheral area of the objective lens is formed in a portion corresponding to the range being than 0.9·NA1 or more, and being 1.2·NA1 or less (more preferably, being 0.95·NA1 or more, and being 1.15·NA1 or less) for the first light flux. More preferably, the border of the outside of the most peripheral area of the objective lens is formed in a portion corresponding to NA1.

When the third light flux passing through the objective lens is converged on the information recording surface of the third optical disc, it is preferable that spherical aberration has at least one discontinuous portion. In that case, it is preferable that the discontinuous portion exists in the range being 0.9·NA3 or more, and being 1.2·NA3 or less (more preferably, being 0.95·NA3 or more, and being 1.15·NA3 or less) for the third light flux.

Further, when the spherical aberration is continuous and does not have the discontinuous portion, and when the third light flux passing through the objective lens is converged on the information recording surface of the third optical disc, it is preferable that the absolute value of the vertical spherical aberration is 0.03 μm or more in NA2, and the absolute value of the vertical spherical aberration is 0.02 μm or less in NA3. More preferably, the absolute value of the vertical spherical aberration is 0.08 μm or more in NA2, and the absolute value of the vertical spherical aberration is 0.01 μm or less in NA3.

Further, because a diffraction efficiency depends on depth of ring shaped zones in a diffractive structure, the diffraction efficiency of the central area for each wavelength can be appropriately set corresponding to the use of the optical pickup apparatus. For example, in the case of the optical pickup apparatus for recording and reproducing information on the first optical disc, and only for reproducing information on the second and the third optical discs, it is preferable that the diffraction efficiency of the central area and/or the peripheral area is defined with considering primarily the diffraction efficiency for the first light flux. On the other hand, in the case of the optical pickup apparatus only for reproducing information on the first optical discs and for recording and reproducing information on the second and third optical discs, it is preferable that the diffraction efficiency of the central area is defined with considering primarily the diffraction efficiency for the second and third light fluxes and the peripheral area is defined with considering primarily the diffraction efficiency for the second light flux.

In any case, when the following conditional expression (8) is satisfied, the diffraction efficiency of the first light flux calculated by the area weighted mean can be secured high.

$$\eta 11 \leq \eta 21 \tag{8}$$

Where, η11 expresses the diffraction efficiency of the first light flux in the central area, η21 expresses the diffraction efficiency of the first light flux in the peripheral area. Hereupon, when the diffraction efficiency of the central area is defined with considering primarily the light fluxes with the second and the third wavelengths, the diffraction efficiency of the first light flux of the central area is decreased. However, in the case where the numerical aperture of the first optical disc is larger than the numerical aperture of the third optical disc, when considered on the whole effective diameter of the first light flux, the diffraction efficiency decrease of the central area does not give so much large influence.

Hereupon, the diffraction efficiency in the present specification can be defined as follows.

(1) The transmittance of an objective lens having the same focal length, the same lens thickness, and the same numerical aperture, being formed of the same material, and excluding the first and the second optical path difference providing structures, is measured for the central area and the peripheral area separately. In this case, the transmittance of the central area is measured with the light flux which enters into the peripheral area being shielded, and the transmittance of the peripheral area is measured with the light flux which enters into the central area being shielded.

(2) The transmittance of the objective optical lens including the first and the second optical path difference providing structures is measured for the central area and the peripheral area separately.

(3) The diffraction efficiencies of both areas are obtained by dividing the results of (2) is divided by the respective results of (1).

Further, the following conditional expression (9) is preferably satisfied, where fl (mm) is a focal length for the first light flux of the objective lens, and d (mm) is a center thickness of the objective lens:

$$0.7 \leq d/fl \leq 1.5 \tag{9}$$

Further, the following conditional expression (10) is more preferably satisfied:

$$1.0 \leq d/fl \leq 1.5 \tag{10}$$

By the above structure, a working distance for a CD as the third optical disc can be secured and the objective lens can be easily manufactured, without reducing a pitch of the optical path difference providing structure. Further, the light utilizing efficiency can be maintained to be high. When an optical disc employing high NA and short wavelength such as a BD is used, a problem of decentration coma and astigmatism can become great. However, when the conditional expression (10) is satisfied, the decentration coma and astigmatism can be in a good condition, which is preferable from this view point. From this view point, the following conditional expression (10') is much more preferably satisfied:

$$1.1 \leq d/fl \leq 1.5 \tag{10'}$$

Further, the following conditional expression is preferable satisfied:

$$2.1 \text{ mm} \leq \Phi \leq 4.2 \text{ mm}$$

In the expression, Φ represents an effective diameter of the objective lens under the condition that the first light flux is used. When the above range is satisfied, a working distance for a CD as the third optical disc is maintained to be a distance in a level which causes no problem to practical use, and further, a change of aberrations due to a change of temperature can be maintained to be a level which causes no problem.

The first light flux, the second light flux, and the third light flux may enter the objective lens as parallel light fluxes, or may enter the objective lens as divergent light fluxes or convergent light fluxes. Preferably, the image-forming manufacture ml of the objective lens when the first light flux enters the objective lens, satisfies the expression (11):

$$-0.02 < m1 < 0.02 \tag{11}$$

On the one hand, when the first light flux enters the objective lens as a divergent light flux, it is preferable that the image-forming manufacture m1 of the objective lens when the first light flux enters the objective lens, satisfies the expression (12):

$$-0.10<m1<0 \tag{12}$$

When the second light flux enters the objective lens as a parallel or almost parallel light flux, it is preferable that the image-forming manufacture m2 of the objective lens when the second light flux enters the objective lens, satisfies the expression (13):

$$-0.02<m2<0.02 \tag{13}$$

On the one hand, when the second light flux enters the objective lens as a divergent light flux, it is preferable that the image-forming manufacture m2 of the objective lens when the second light flux enters the objective lens, satisfies the expression (14):

$$-0.10<m2<0 \tag{14}$$

When the third light flux enters the objective lens as a parallel or almost parallel light flux, it is preferable that the image-forming manufacture m3 of the objective lens when the third light flux enters the objective lens, satisfies the expression (15):

$$-0.02<m3<0.02 \tag{15}$$

When the third light flux is a parallel light flux, a problem can be caused easily in a tracking operation. However, in the present invention, an excellent tracking characteristics can be obtained even when the third light flux is a parallel light flux, and information can be recorded and/or reproduced properly for three different optical discs.

On the one hand, when the third light flux enters the objective lens as a divergent light flux, it is preferable that the image-forming manufacture m3 of the objective lens when the third light flux enters the objective lens, satisfies the expression (16):

$$-0.10<m3<0 \tag{16}$$

The working distance (WD) of the objective lens in the use of the third optical disc is preferably 0.20 mm or mom, and 1.5 mm or less. It is more preferably 0.3 mm or more, and 1.20 mm or less. Next, the WD of the objective lens in the use of the second optical disc is preferably 0.4 mm or more, and 1.3 mm or less. Further more, the WD of the objective lens in the use of the first optical disc is preferably 0.4 mm or more, and 1.2 mm or less.

The optical information recording and reproducing apparatus according to the present invention, has the optical disc drive apparatus having the above described optical pickup apparatus.

Herein, the optical disc drive apparatus installed in the optical information recording and reproducing apparatus will be described. There is provided an optical disc drive apparatus employing a system of taking only a tray which can hold an optical disc under the condition that the optical disc is mounted thereon, outside from the main body of the optical information recording and reproducing apparatus in which optical pickup apparatus is housed; and a system of taking out the main body of the optical disc drive apparatus in which the optical pickup apparatus is housed.

The optical information recording and reproducing apparatus using each of the above described systems, is generally provided with the following component members but the members are not limited to them: an optical pickup apparatus housed in a housing; a drive source of the optical pickup apparatus such as seek-motor by which the optical pickup apparatus is moved toward the inner periphery or outer periphery of the optical disc for each housing, traveling means having a guide rail for guiding the optical pickup apparatus toward the inner periphery or outer periphery of the optical disc; and a spindle motor for rotation driving of the optical disc.

The optical information recording and reproducing apparatus employing the former system is provide with, other than these component members, a tray which can hold the optical disc with the optical disc being mounted thereon, and a loading mechanism for slidably moving the tray. The optical information recording and reproducing apparatus employing the latter system does not include the tray and loading mechanism, and it is preferable that each component member is provided in the drawer corresponding to chassis which can be taken out outside.

Advantageous Effect of Invention

According to the present invention, there can be provided an optical pickup apparatus and an objective lens which can properly record and/or reproduce information for three different discs such as a high density optical disc (especially, Blu-ray disc, which is referred as BD in the following descriptions), DVD, and CD, and which can make light utilizing efficiency high with employing a simple configuration.

Figure 1A:
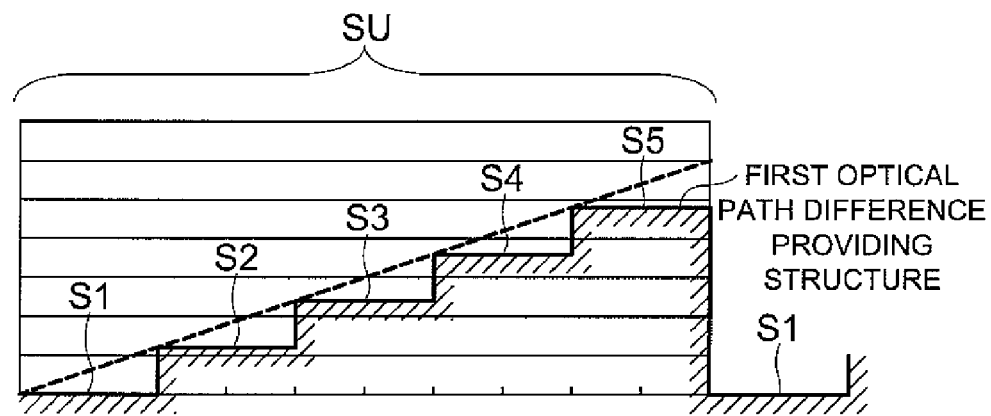
FIG. 1a is a sectional view obtained by cutting a step type of first optical path difference providing structure in a conventional art along a plane including the optical axis.
Figure 1B:
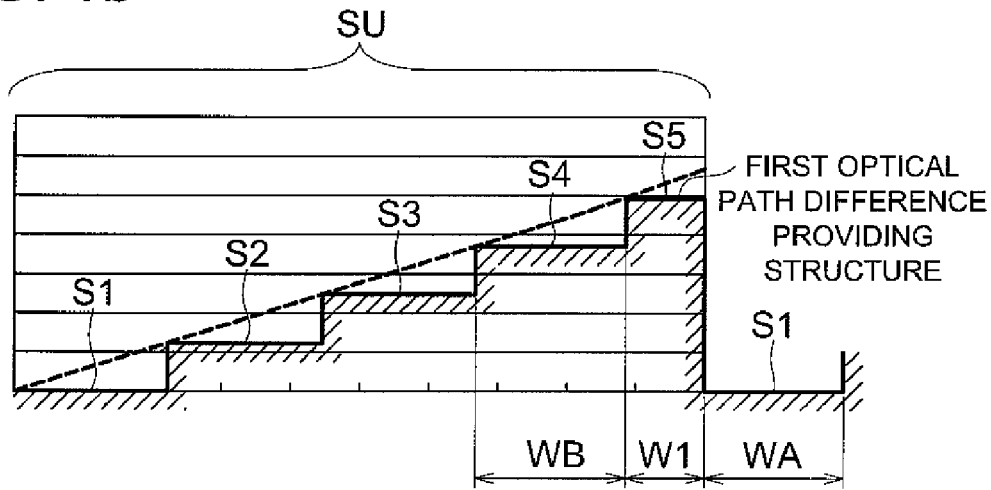
FIG. 1b is a sectional view obtained by cutting a step type of first optical path difference providing structure relating to an example of the present invention along a plane including the optical axis.
Figure 2A:
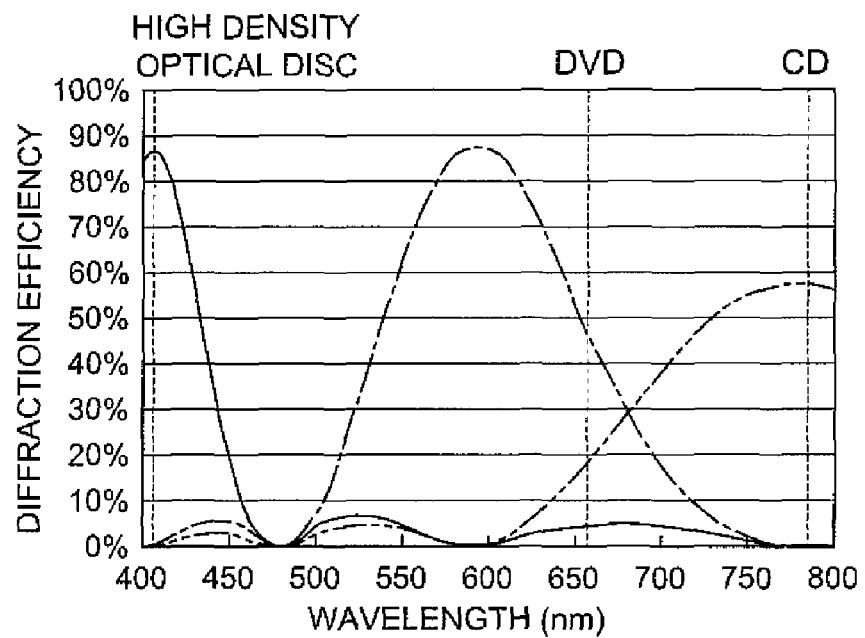
Figure 2B:
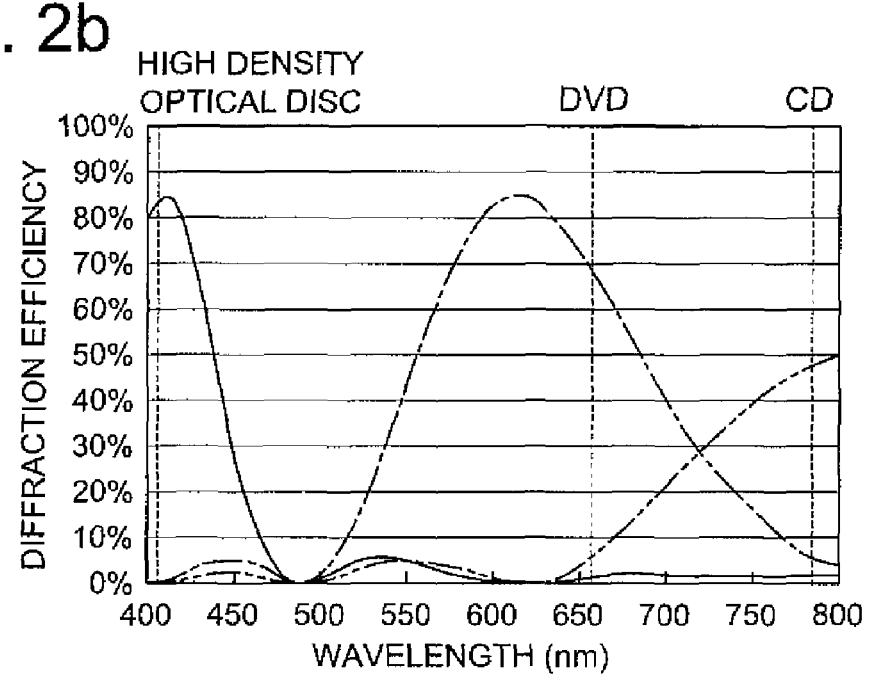

Each of FIGS. 2a and 2b is a diagram showing diffraction efficiencies for respective wavelength, with diffraction efficiency as a vertical axis and wavelength as the horizontal axis.

Figure 3A:
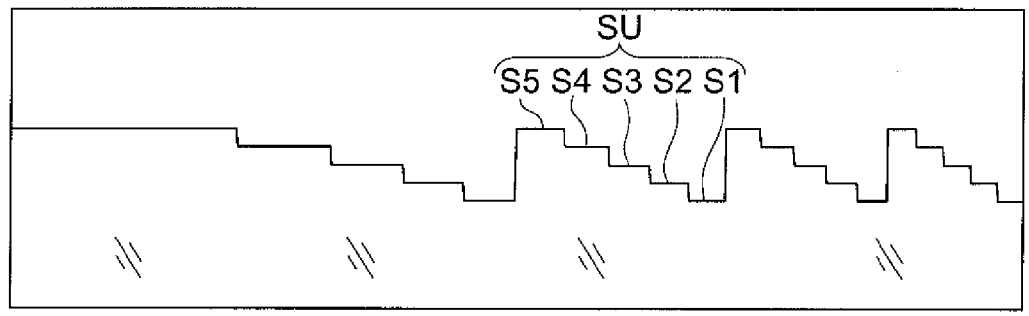
Figure 3B:
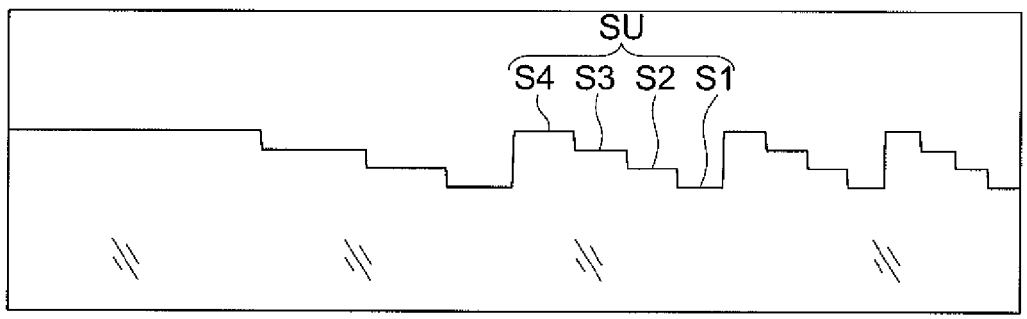
Figure 3C:
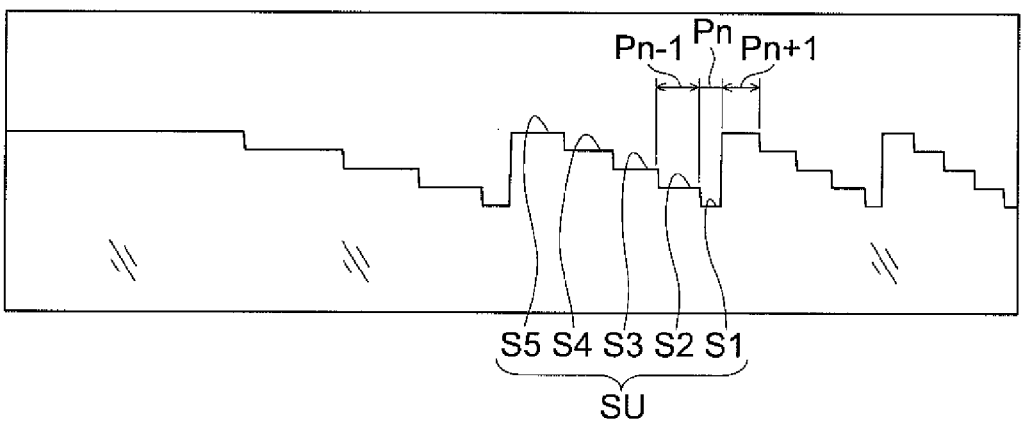

Each of FIGS. 3a, 3b and 3c is a sectional view obtained by cutting a step type of first optical path difference providing structure which generates diffracted light fluxes relating to claim 4, along a plane including the optical axis.

Figure 4A:
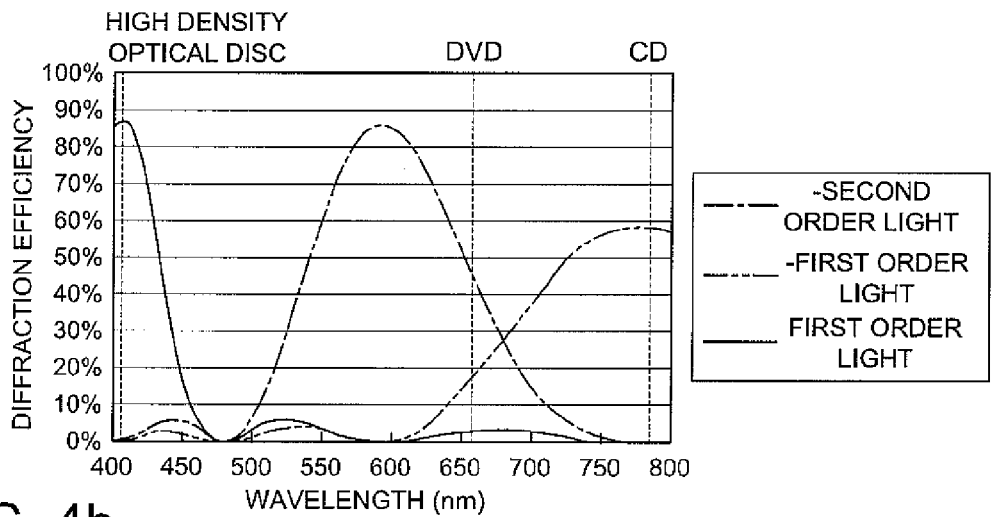
Figure 4B:
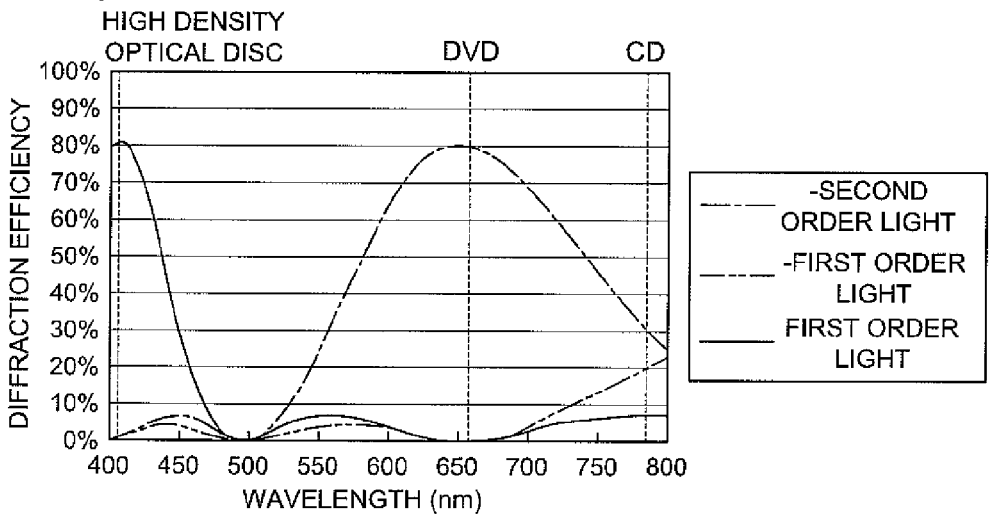
Figure 4C:
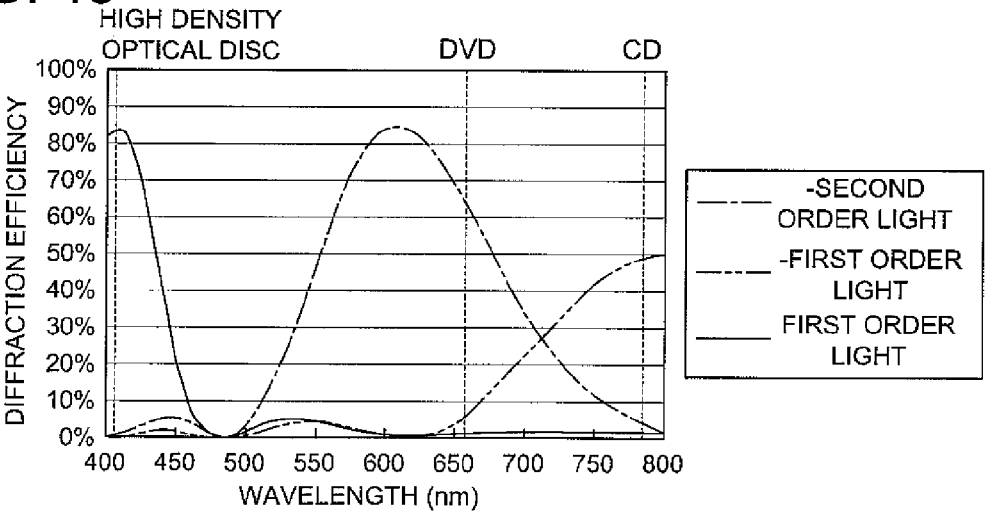

Each of FIGS. 4a, 4b and 4c is a diagram showing diffraction efficiencies for respective wavelength, with diffraction efficiency as a vertical axis and wavelength as the horizontal axis.

Figure 5A:
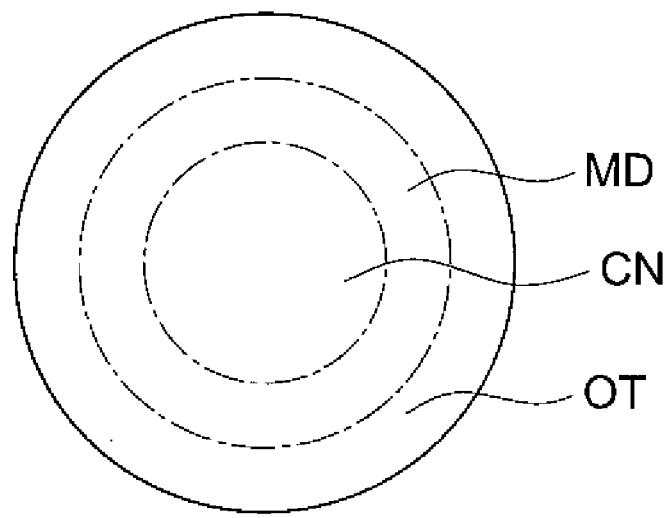
Figure 5B:
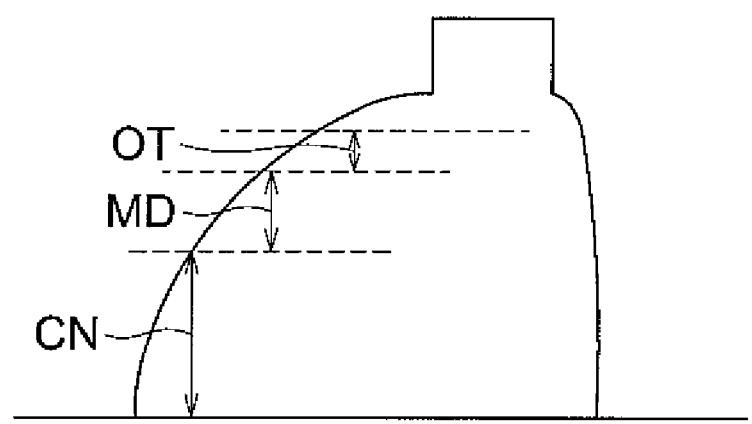

FIG. 5a is a diagram showing one example of the objective lens relating to the present invention and observed from the optical axis direction, and FIG. 5b is a sectional view of the objective lens.

Figure 6:
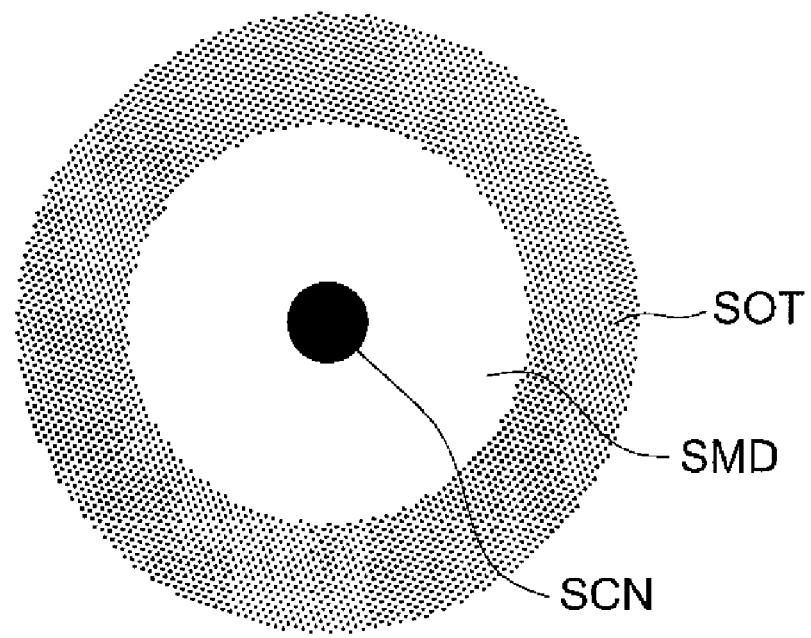

FIG. 6 is a diagram showing a shape of spot formed by the objective lens relating to the present invention.

Figure 7:
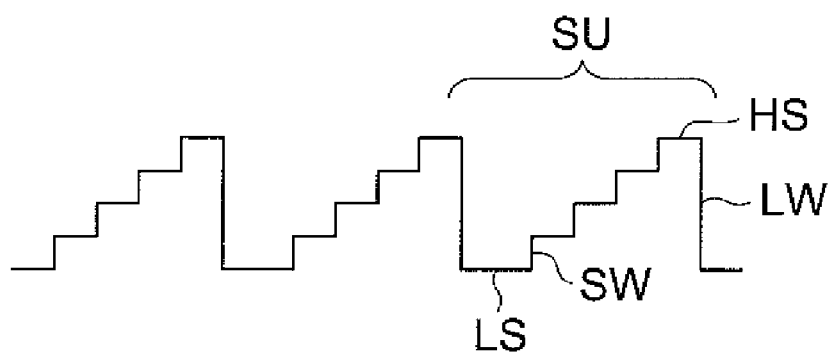

FIG. 7 is a sectional view schematically showing an optical path difference providing structure arranged on the objective lens OBJ relating to the present invention.

Figure 8:
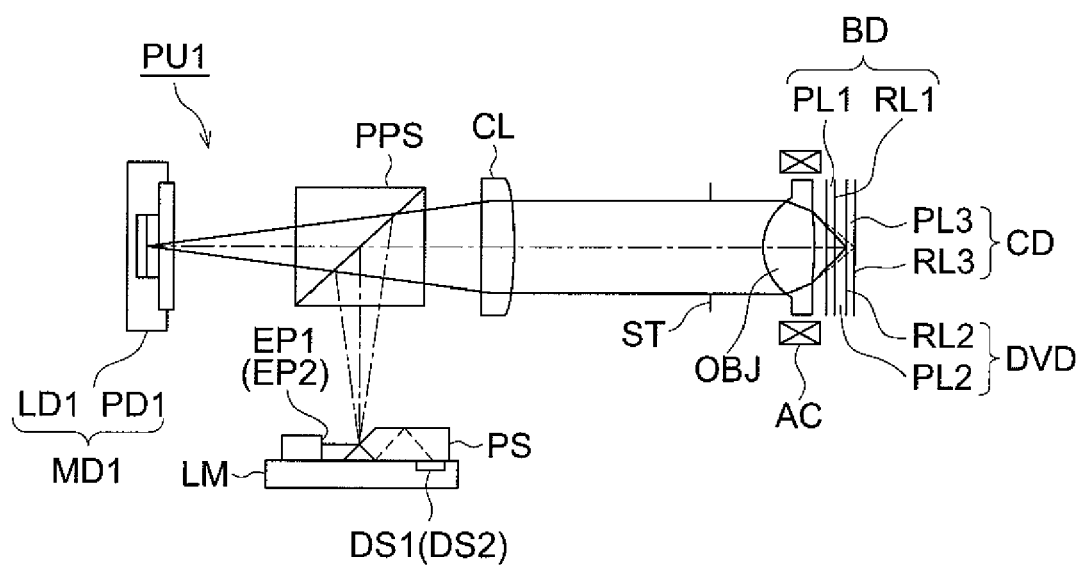

FIG. 8 is a diagram schematically showing a construction of the optical pickup apparatus relating to the present invention.

Figure 9:
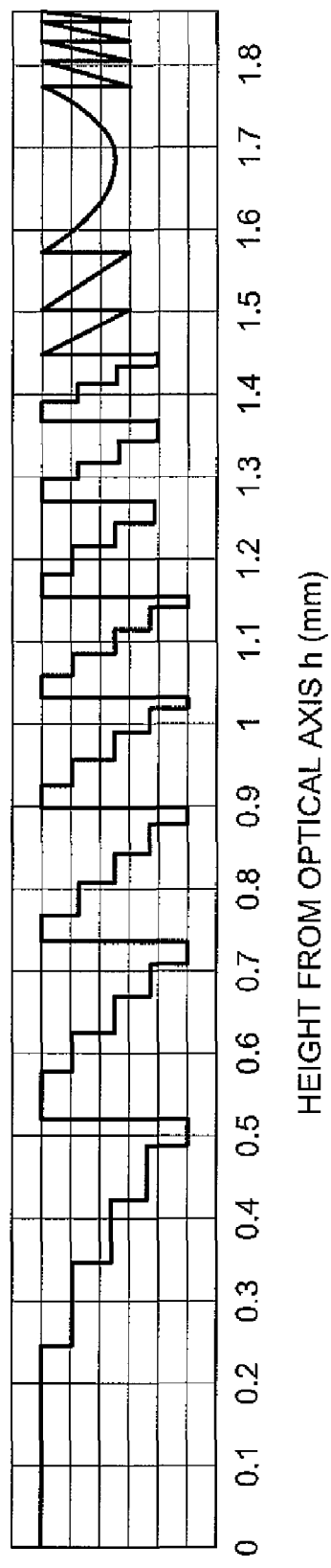

FIG. 9 is a sectional view of the optical path difference providing structure of the example enlarged in the optical axis direction.

Figure 10:
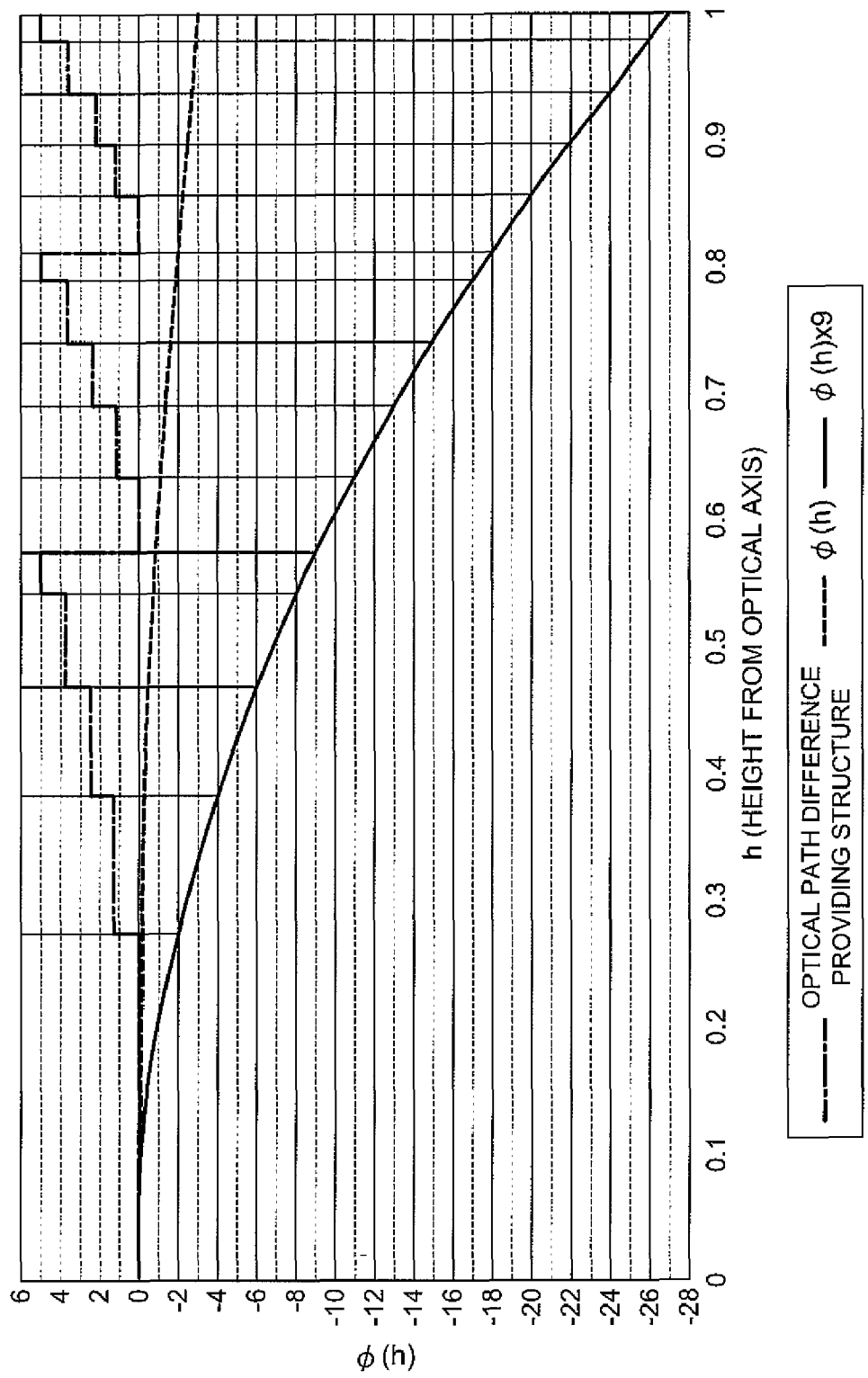

FIG. 10 is a graph showing a relationship of an optical path difference function and an optical path difference providing structure for illustrating an expression "uniform in terms of a function".

Figure 11A:
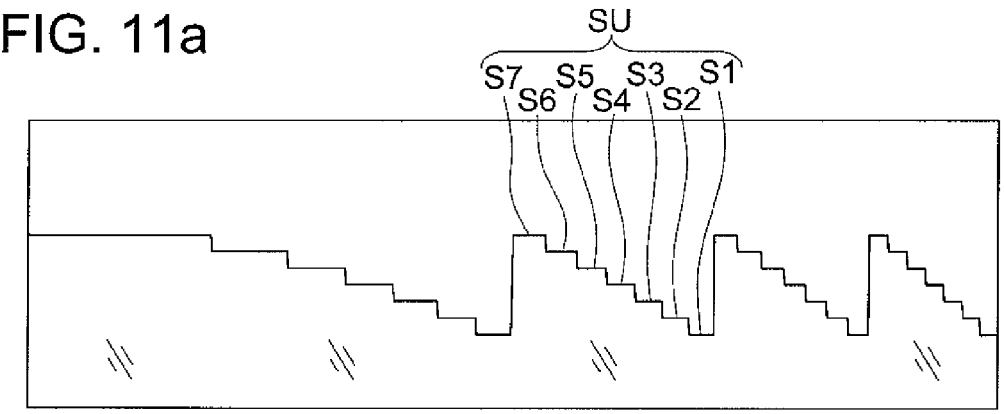
Figure 11B:
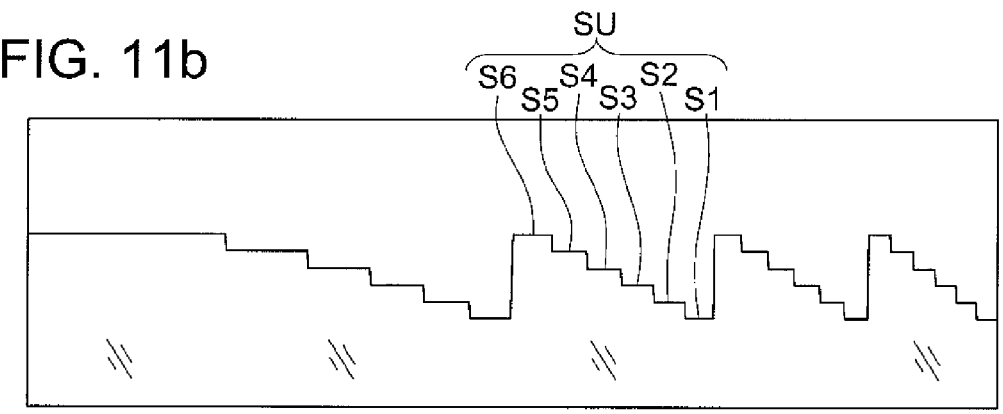
Figure 11C:
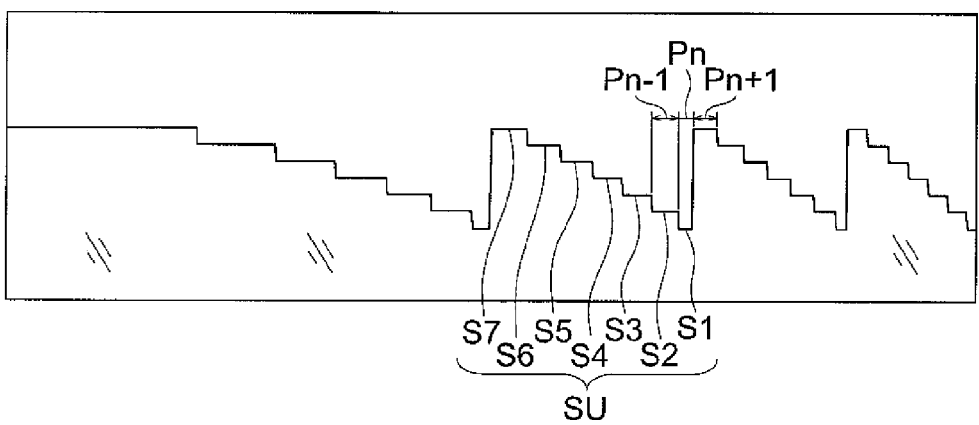

Each of FIGS. 11a, 11b, and 11c is a sectional view obtained by cutting a step type of first optical path difference providing structure which generates diffracted light fluxes relating to Item 6, along a plane including the optical axis.

Figure 12A:
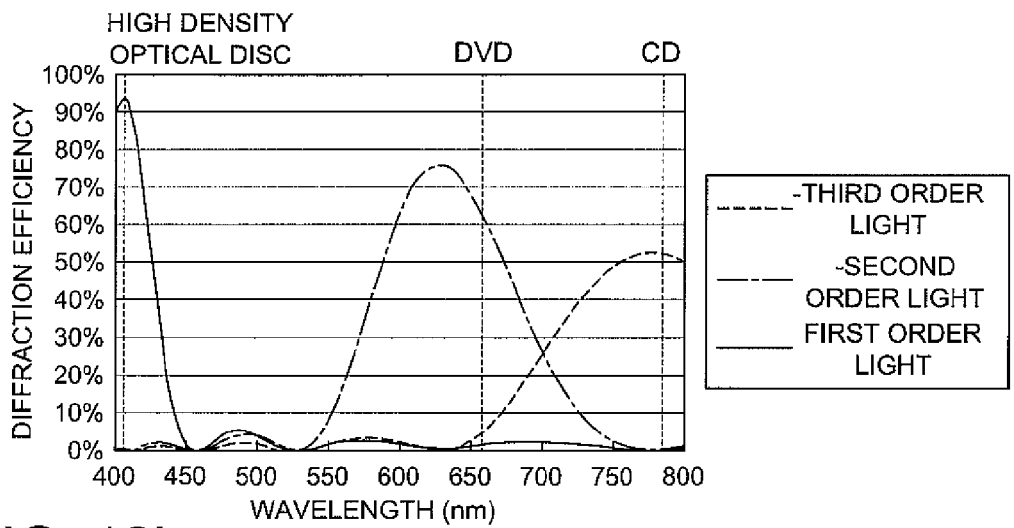
Figure 12B:
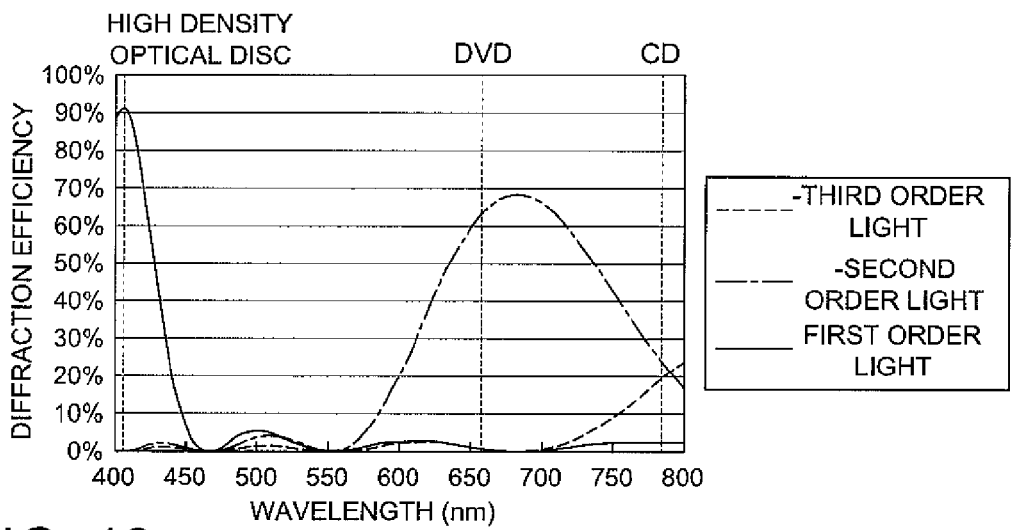
Figure 12C:
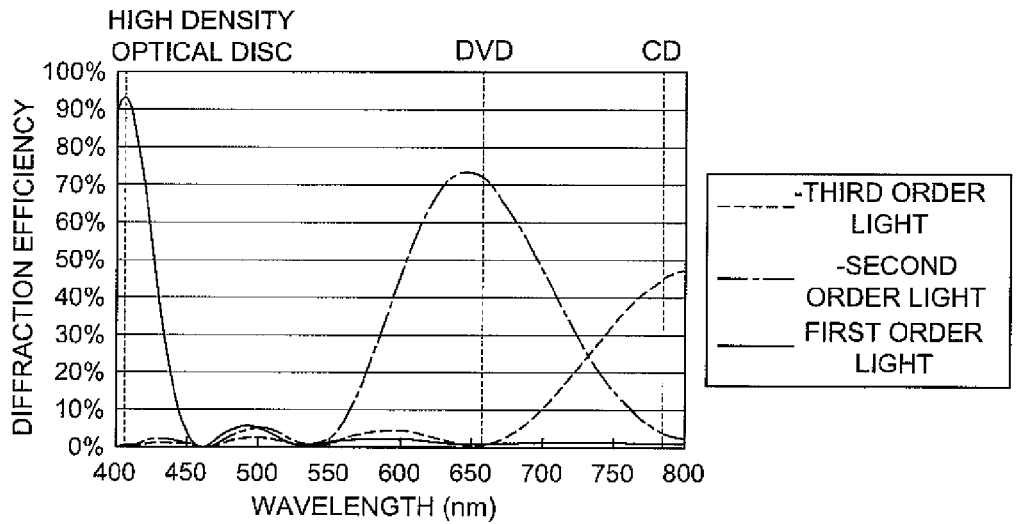

Each of FIGS. 12*a*, 12*b* and 12*c* is a diagram showing diffraction efficiencies for respective wavelength, with diffraction efficiency as a vertical axis and wavelength as the horizontal axis.

DESCRIPTION OF EMBODIMENTS

Referring to the drawings, the embodiment of the present invention will be described below. FIG. 8 is a diagram schematically showing a construction of the optical pickup apparatus PU1 of the present embodiment capable of recording and/or reproducing information adequately for a BD, DVD and CD which are different optical discs. The optical pickup apparatus PU1 can be mounted in the optical information recording and reproducing apparatus. Herein, the first optical disc is a ED, the second optical disc is a DVD, and the third optical disc is a CD. Hereupon, the present invention is not limited to the present embodiment.

The optical pickup apparatus PU1 comprises objective lens OBJ; stop ST; collimation lens CL; dichroic prism PPS; first semiconductor laser LD1 (the first light source) which emits a laser light flux with a wavelength of $\lambda 1=405$ nm (the firs light flux) when recording/reproducing information for BD; and first light-receiving element PD1 which receives the reflection light from information recording surface RL1 of a BD; and laser module LM.

Further, laser module LM comprises second semiconductor laser EP1 (the second light source) which emits the laser light flux with a wavelength of $\lambda 2=658$ nm (the second light flux) when recording and/or reproducing information for DVD; third semiconductor laser EP2 (the third light source) emitting the laser light flux with a wavelength of $\lambda 3=785$ nm (the third light flux) when recording and/or reproducing information for CD; second light-receiving element DS1 which receives the reflection light flux from the information recording surface RL2 of a DVD; the third light-receiving element DS2 which receives the reflection light flux from the information recording surface RL3 of a CD; and prism PS.

As shown in FIGS. 5*a* and 5*b*, in objective lens OBJ of the present embodiment, there are formed central area CN including the optical axis; peripheral area MD arranged around the central area; and most peripheral area OT further arranged around the peripheral area which are formed concentrically around the optical axis as a center. A first optical path difference providing structure is formed in central area CN and a second optical path difference providing structure is formed in peripheral area MD, which are not illustrated in the figures. Further, a third optical path difference providing structure is formed in most peripheral area OT. The first optical path difference providing structure has a sectional shape shown in FIG. 3*c*. The first optical path difference providing structure makes the amount of the first-order diffracted light of the first light flux which has passed through the first optical path difference providing structure, larger than the amounts of diffracted light of any other orders, makes the amount of the minus-first-order diffracted light of the second light flux larger than the amounts of diffracted light of any other orders, and makes the amount of the minus-second-order diffracted light of the third light flux larger than the amounts of diffracted light of any other orders. Further, the second optical path difference providing structure makes the amount of the first-order diffracted light of the first light flux which has passed through the second optical path difference providing structure, larger than the amounts of diffracted light of any other orders, and makes the amount of the minus-first-order diffracted light of the second light flux larger than the amounts of diffracted light of any other orders. Further, the third optical path difference providing structure makes the amount of the third-order diffracted light of the third light flux which has passed through the third optical path difference providing structure, larger than the amounts of diffracted light of any other orders. The ratios of areas of the central area, the peripheral area, and the most peripheral area in FIGS. 5*a* and 5*b* are not represented accurately.

Blue-violet semiconductor laser diode LD1 emits a first light flux ($\lambda 1=405$ nm) which is a divergent light flux. The divergent light flux passes through dichroic prism PPS, and is converted into a parallel light flux by collimation lens CL. The resulting light flux is converted from linear polarized light into circular polarized light by the ¼ wavelength plate which is not shown. The diameter of the converted light flux is regulated by stop ST, and the resulting light flux enter objective lens OBJ. The light flux which is converged by the most peripheral area, the central area, and the peripheral area passes through protective substrate PL1 with the thickness of 0.1 mm, then, is formed into a spot on information recording surface RL1 of a BD. In this structure, the first-order diffracted light of the first light flux generated in the central area, the first-order diffracted light of the first light flux generated in the peripheral area, and the third-order diffracted light of the first light flux generated in the most peripheral area are converged on the information recording surface of a BD.

The reflection light flux which is modulated on the information recording surface RL1 by the information pit, passes through objective lens OBJ and stop ST again, and is converted from circular polarized light into linear polarized light by the ¼ wavelength plate which is not shown. Then, collimation lens CL converts the light flux into a convergent light flux. The convergent light flux passes through dichroic prism PPS and is converged on the light receiving surface of the first light-receiving element PD1. Then, information recorded in a BD can be read based on the output signal of the first light-receiving element PD1, by focusing or tracking objective optical element OBJ using two-axis actuator AC.

Red semiconductor laser EP1 emits a second light flux ($\lambda 2=658$ nm) which is a divergent light flux. The divergent light flux is reflected by prism PS and is further reflected by dichroic prism PPS. The light flux is converted into a parallel light flux by collimation lens CL and the collimated light flux is converted from linear polarized light into circular polarized light by the ¼ wavelength plate which is not shown. The resulting light flux enters into objective lens OBJ. Herein, the light flux converged by the central area and the peripheral area of the objective lens OBJ (the light flux passing through the most peripheral area is made into flare light, and forms the peripheral spot portion), becomes a spot on information recording surface RL2 of a DVD through the protective substrate PL2 with a thickness of 0.6 mm, and forms the central spot portion. In this structure, the minus-first-order dim acted light of the second light flux generated in the central area, and the minus-first-order diffracted light of the second light flux generated in the peripheral area are converged on the information recording surface of a DVD.

The light flux which is modulated on information recording surface RL2 by the information pit, passes through objective lens OBJ and stop ST again, and is converted from circular polarized light into linear polarized light by the ¼ wavelength plate which is not shown. Then, the resulting light flux is converted by collimation lens CL into a convergent light flux, the convergent light flux is reflected by dichroic prism PPS, then, is reflected two times in the prism, and converged on the second light receiving element DS1. Then, the information recorded in DVD can be read by using the output signal of the second light-receiving element DS1. Herein, when the light flux on the returning path is converted in terms of polarization by the ¼ wavelength plate, the light utilization efficiency can make higher than the case that the ¼ wavelength plate is not employed.

Infrared semiconductor laser EP2 emits the third light flux (λ3=785 nm) which is a divergent light flux. The divergent light flux is reflected by prism PS, and further reflected by dichroic prism PPS. The resulting light flux is converted by collimation lens CL into a parallel light flux and the resulting light flux is converted in terms of polarization by the ¼ wavelength plate which is not shown. The converted light flux enters objective lens OBJ. Herein, the light flux converged by the central area of the objective lens OBJ (the light flux passing through the peripheral area and the most peripheral area is made into flare light, and forms the peripheral spot portion), becomes a spot on information recording surface RL3 of a CD through the protective substrate PL3 with thickness of 1.2 mm, and forms the central spot portion. In this structure, the minus-second-order diffracted light of the third light flux generated in the central area is converged on the information recording surface of a CD.

The reflection light flux which is modulated on information recording surface RL3 by the information pit, passes through objective lens OBJ and stop ST again, and is converted in terms of polarization by the ¼ wavelength plate which is not shown. Then, the resulting light flux is converted into a convergent light flux by collimation lens CL, and is reflected by dichroic prism PPS, then, is further reflected two times in the prism. The reflected light flux is converged on the third light-receiving element DS2. Then, information recorded in a CD can be read by using output signal of the third light-receiving element DS2. Herein, when the light flux on the returning path is converted in terms of polarization by the ¼ wavelength plate, the light utilization efficiency can make higher than the case that the ¼ wavelength plate is not employed.

EXAMPLE

Next, an example which can be used for the above-described embodiment will be described.

Table 3 shows the lens data of Example 1. FIG. 9 shows a sectional view of the example.

In the present example, in an optical surface facing the light source of the objective lens, there are formed a first optical path difference providing structure being a step structure in the central area, a second optical path difference providing structure being a step structure in the peripheral area, and a third optical path difference providing structure being a blaze-type diffractive structure in the most peripheral area. In the first optical path difference providing in the central area, w1=0.5 w2 holds. Hereinafter, the power of 10 will be expressed as by using "E" (for example, $2.5 \times 10^{-3}$ will be expressed as 2.5E-3).

TABLE 3

| | | Example 1 | | | | | |
|---|---|---|---|---|---|---|---|
| | | BD | | DVD | | CD | |
| Focal length | | $f_1 = 2.20$ mm | | $f_2 = 2.40$ mm | | $f_3 = 2.55$ mm | |
| Numerical aperture | | NA1 = 0.85 | | NA2 = 0.60 | | NA2 = 0.45 | |
| Image-forming magnification | | m = 0 | | m = 0 | | m = 0 | |
| The i-th surface | ri | di (405 nm) | ni (405 nm) | di (658 nm) | ni (658 nm) | di (785 nm) | ni (785 nm) |
| 0 | ∞ | | | ∞ | | ∞ | |
| 1-1 | 1.51130 | 2.70 | 1.56013 | 2.70 | 1.54062 | 2.70 | 1.5372 Aspheric surface, diffraction surface |
| 1-2 | 1.55414 | — | 1.56013 | — | 1.54062 | — | 1.5372 Aspheric surface, diffraction surface |
| 1-3 | 1.55765 | — | 1.56013 | — | 1.54062 | — | 1.5372 Aspheric surface, diffraction surface |
| 2 | −2.73424 | 0.69015 | 1.00000 | 0.62414 | 1.00000 | 0.45993 | 1.0000 Aspheric surface |
| 3 | ∞ | 0.0875 | 1.61949 | 0.60 | 1.57732 | 1.20 | 1.5706 |
| 4 | ∞ | | | | | | |

*di represents a displacement from the i-th surface to the (i + 1)-th surface
Data of aspheric surface and diffraction surface (optical path difference function)
Aspheric surface coefficient

| | (1-1)-th surface Central area | (1-2)-th surface Peripheral area | (1-3)-th surface Most peripheral area | 2nd surface |
|---|---|---|---|---|
| κ | −6.0762E−01 | −3.1092E+01 | −3.1092E+01 | −3.1092E+01 |
| A0 | 0.0000E+00 | 0.0000E+00 | 0.0000E+00 | 0.0000E+00 |
| A4 | 8.1454E−03 | 8.0690E−02 | 8.0690E−02 | 8.0690E−02 |
| A6 | 8.7988E−04 | −5.7930E−02 | −5.7930E−02 | −5.7930E−02 |
| A8 | 2.6303E−04 | 1.8637E−02 | 1.8637E−02 | 1.8637E−02 |
| A10 | 1.2237E−04 | −7.0213E−04 | −7.0213E−04 | −7.0213E−04 |
| A12 | 1.6637E−05 | −1.2306E−03 | −1.2306E−03 | −1.2306E−03 |
| A14 | −1.1944E−05 | 2.4548E−04 | 2.4548E−04 | 2.4548E−04 |
| A16 | −8.9121E−07 | — | — | — |
| A18 | 2.3355E−06 | — | — | — |
| A20 | −4.8778E−07 | — | — | — |

TABLE 3-continued

| | Optical path difference function coefficient (1st surface) | | |
|---|---|---|---|
| | (1-1)-th surface Central area $0 \leq h < 1.155$ | (1-2)-th surface Peripheral area $1.155 \leq h < 1.448$ | (1-3)-th surface Most peripheral area $1.448 \leq h$ |
| B2 | −7.3166E−03 | −7.6387E−03 | −2.7283E−03 |
| B4 | 6.6183E−04 | 1.3720E−03 | 7.6430E−04 |
| B6 | −5.6772E−04 | −1.1025E−03 | −2.8021E−04 |
| B8 | 2.8528E−04 | 4.0846E−04 | −7.0206E−05 |
| B10 | −6.8156E−05 | −5.7435E−05 | 3.5542E−05 |
| Diffractive structure shape | Step | Step | Blaze |
| $\lambda_B$ | 405 nm | 405 nm | 405 nm |
| dor:(λ1) | 1 | 1 | 3 |
| dor:(λ2) | −1 | −1 | — |
| dor:(λ3) | 2 | — | — |
| p | 4.5 | 4 | — |
| M | 1.22 | 1.25 | — |

Each optical surface of the objective lens is formed into an aspheric surface which is axial symmetry around the optical axis and is regulated by an expression obtained by substituting coefficients shown in the table to the expression of Math 1.

$$X(h) = \frac{-(h/R)^2}{1 + \sqrt{1 - (1+\kappa)(h/R)^2}} + \sum_{i=0}^{10} A_{2i} h^{2i} \quad [\text{Math 1}]$$

Herein, X(h) represents the axis along the optical axis (the direction of traveling light is defined as a positive direction), κ is a conical constant, $A_{2i}$ is an aspheric surface coefficient, and h is the height from the optical axis.

Further, a pitch of the diffractive structure is defined by a portion being an integer of the optical path difference function represented by the expression of Math 2, and an optical path length provided for a light flux with each wavelength by each ring-shaped zone is defined by an expression obtained by substituting the coefficients shown in the table into the function represented by Math 3.

$$\Phi(h) = dor \times \sum_{i=0}^{6} B_{2i} h^{2i} \times \lambda_B / \lambda_i \quad [\text{Math 2}]$$

$$\Phi'(h) = M \times \text{INT}\left[p \times \text{MOD}\left\{\sum_{i=0}^{6} B_{2i} h^{2i}\right\}\right] \quad [\text{Math 3}]$$

h: Height from the optical axis
$A_{2i}$: Aspheric surface coefficient
$B_{2i}$: Optical path difference function coefficient
INT: Integer portion of a number
$\lambda_B$: Reference wavelength of a blaze-shaped diffractive structure
$\lambda_i$: Wavelength
M: Optical path difference per each step of the step shape Unit: λB
p: Number of divided sections of the step shape Herein, h represents a height from the optical axis, $B_{2i}$ represents an optical path providing function coefficient, MOD represents a decimal portion of a number, INT represents an integer portion of a number, $\lambda_B$ represents a reference wavelength of a blaze-shaped diffractive structure, $\lambda_i$ represents wavelength of incident light, M represents an optical path difference per each step of the step shape (Unit: λB), and p represents the number of divided sections of the step shape. In the table of Example 1, the value p (the number of divided sections) of the first optical path difference providing structure in the central area which is shown as 4.5 means that the width of one of the five steps is reduced. In other words, the first optical path difference providing structure of Example 1 is a step structure including step units with five steps such that one small step difference in the step units provides an optical path difference by 1.22 λB. Further, the first optical path difference providing structure of Example 1 makes the amount of first-order diffracted light of the light flux with a wavelength of 405 nm which has passed through the first optical path difference providing structure, larger than diffracted light of any other diffraction orders, makes the amount of minus-first-order diffracted light of the light flux with a wavelength of 658 nm which has passed through the first optical path difference providing structure, larger than diffracted light of any other diffraction orders, and makes the amount of minus-second-order diffracted light of the light flux with a wavelength of 785 nm which has passed through the first optical path difference providing structure, larger than diffracted light of any other diffraction orders. The optical path difference providing structure of Example 1 satisfies w1 =0.5 w2.

FIG. 2b shows the diagram of diffraction efficiencies at the central area of the present example. As can be seen from the diagram, high diffraction efficiencies can be obtained for either of a BD, DVD, and CD in a well-balanced condition.

REFERENCE SIGNS LIST

AC Two-axis actuator
PPS Dichroic prism
CL Collimation lens
LD1 Blue-violet semiconductor laser
LM Laser module
OBJ Objective lens
PL1 Protective substrate
PL2 Protective substrate
PL3 Protective substrate
PU1 Optical pickup apparatus
RL1 Information recording surface
RL2 Information recording surface RL3 Information recording surface
CN Central area
MD Peripheral area
OT Most peripheral area

The invention claimed is:

1. An objective lens for an optical pickup apparatus comprising an objective lens
for forming a converged spot on an information recording surface of a first optical disc including a protective layer with a thickness t1 by using a first light flux with a wavelength λ1 emitted from a first light source,
for forming a converged spot on an information recording surface of a second optical disc including a protective layer with a thickness t2 (t1≦t2) by using a second light flux with a wavelength λ2 (λ1<λ2) emitted from a second light source, and
for forming a converged spot on an information recording surface of a third optical disc including a protective layer with a thickness t3 (t2<t3) by using a third light flux with a wavelength λ3 (λ2<λ3) emitted from a third light source, the objective lens comprising
an optical surface comprising a first optical path difference providing structure which is a step structure in which a plurality of ring-shaped step units each including same number of steps are arranged concentrically about an optical axis as a center,
wherein a width w1 which is a width in a perpendicular direction to the optical axis of one of a highest step and a lowest step of at least one of the step units, and an average value w2 which is an average of widths of two steps arranged at both sides of the one of the highest step and the lowest step along a direction perpendicular to the optical axis satisfy the following relational expression:

$$0.2w2 \leq w1 \leq 0.8w2 \quad (1).$$

2. The objective lens of claim 1, wherein
in all the step units in the step structure, one of the highest step and the lowest step satisfy the expression (1).

3. The objective lens of claim 1, wherein
the optical surface of the objective lens comprises at least a central area including the optical axis, a peripheral area in a ring shape formed around the central area, and a most peripheral area in a ring shape formed around the peripheral area,
the first light flux which has passed through the central area, the peripheral area, and the most peripheral area is converged so that information can be recorded and/or reproduced on the information recording surface of the first optical disc,
the second light flux which has passed through the central area and the peripheral area is converged so that information can be recorded and/or reproduced on the information recording surface of the second optical disc, and the second light flux which has passed through the most peripheral area is not converged so that information can be recorded and/or reproduced on the information recording surface of the second optical disc
the third light flux which has passed through the central area is converged so that information can be recorded and/or reproduced on the information recording surface of the third optical disc, and the third light flux which has passed through the peripheral area and the most peripheral area is not converged so that information can be recorded and/or reproduced on the information recording surface of the third optical disc, and
the first optical path difference providing structure is formed in the central area.

4. The objective lens of claim 1, wherein
only the lowest step satisfies the expression (1).

5. The objective lens of claim 1, wherein
the first optical path difference providing structure is an optical path difference providing structure that
makes an amount of first-order diffracted light of the first light flux which has passed through the first optical path difference providing structure larger than amounts of diffracted light of any other orders (including a zero-th order),
makes an amount of minus-first-order diffracted light of the second light flux which has passed through the first optical path difference providing structure larger than amounts of diffracted light of any other orders (including a zero-th order), and
makes an amount of minus-second-order diffracted light of the third light flux which has passed through the first optical path difference providing structure larger than amounts of diffracted light of any other orders (including a zero-th order).

6. The objective lens of claim 1, wherein
the first optical path difference providing structure is an optical path difference providing structure that
makes an amount of first-order diffracted light of the first light flux which has passed through the first optical path difference providing structure larger than amounts of diffracted light of any other orders (including a zero-th order),
makes an amount of minus-second-order diffracted light of the second light flux which has passed through the first optical path difference providing structure larger than amounts of diffracted light of any other orders (including a zero-th order), and
makes an amount of minus-third-order diffracted light of the third light flux which has passed through the first optical path difference providing structure larger than amounts of diffracted light of any other orders (including a zero-th order).

7. The objective lens of claim 1, wherein
the one of the highest step and the lowest step satisfies the following relational expression:

$$0.4w2 \leq w1 \leq 0.6w2 \quad (2).$$

8. The objective lens of claim 1, wherein
amounts of step differences in a direction of the optical axis are almost same to each other, where each of the step differences is formed between neighboring steps in the step units.

9. The objective lens of claim 1, wherein
widths in a perpendicular direction to the optical axis of the steps excluding the one of the highest step and the lowest step satisfying the expression (1) are uniform in terms of a function.

10. The objective lens of claim 1, wherein
in one of the step units, widths in a perpendicular direction to the optical axis of the steps excluding the one of the highest step and the lowest step satisfying the expression (1) are almost same to each other.

11. An optical pickup apparatus comprising an objective lens for forming a converged spot on an information recording surface of a first optical disc including a protective layer with a thickness t1 by using a first light flux with a wavelength λ1 emitted from a first light source,
for forming a converged spot on an information recording surface of a second optical disc including a protective layer with a thickness t2 (t1≦t2) by using a second light flux with a wavelength λ2 (λ1<λ2) emitted from a second light source, and for forming a converged spot on an information recording surface of a third optical disc including a protective layer with a thickness t3 (t2<t3) by using a third light flux with a wavelength λ3 (λ2<λ3) emitted from a third light source, wherein an optical surface of the objective lens comprises a first optical path difference providing structure which is a step structure in which a plurality of ring-shaped step units each including same number of steps are arranged concentrically about an optical axis as a center, and a width w1 which is a width in a perpendicular direction to the optical axis of one of a highest step and a lowest step of at least one of the step units, and an average value w2 which is an average of widths of two steps arranged at both sides of the one of the highest step and the lowest step along a direction perpendicular to the optical axis satisfy the following relational expression:

$$0.2w2 \leq w1 \leq 0.8w2 \tag{1}.$$

12. The optical pickup apparatus of claim 11, wherein in all the step units in the step structure, one of the highest step and the lowest step satisfy the expression (1).

13. The optical pickup apparatus of claim 11, wherein the optical surface of the objective lens comprises at least a central area including the optical axis, a peripheral area in a ring shape formed around the central area, and a most peripheral area in a ring shape formed around the peripheral area, the first light flux which has passed through the central area, the peripheral area, and the most peripheral area is converged so that information can be recorded and/or reproduced on the information recording surface of the first optical disc, the second light flux which has passed through the central area and the peripheral area is converged so that information can be recorded and/or reproduced on the information recording surface of the second optical disc, and the second light flux which has passed through the most peripheral area is not converged so that information can be recorded and/or reproduced on the information recording surface of the second optical disc the third light flux which has passed through the central area is converged so that information can be recorded and/or reproduced on the information recording surface of the third optical disc, and the third light flux which has passed through the peripheral area and the most peripheral area is not converged so that information can be recorded and/or reproduced on the information recording surface of the third optical disc, and the first optical path difference providing structure is formed in the central area.

14. The optical pickup apparatus of claim 11, wherein only the lowest step satisfies the expression (1).

15. The optical pickup apparatus of claim 11, wherein the first optical path difference providing structure is an optical path difference providing structure that makes an amount of first-order diffracted light of the first light flux which has passed through the first optical path difference providing structure larger than amounts of diffracted light of any other orders (including a zero-th order), makes an amount of minus-first-order diffracted light of the second light flux which has passed through the first optical path difference providing structure larger than amounts of diffracted light of any other orders (including a zero-th order), and makes an amount of minus-second-order diffracted light of the third light flux which has passed through the first optical path difference providing structure larger than amounts of diffracted light of any other orders (including a zero-th order).

16. The optical pickup apparatus of claim 11, wherein the first optical path difference providing structure is an optical path difference providing structure that makes an amount of first-order diffracted light of the first light flux which has passed through the first optical path difference providing structure larger than amounts of diffracted light of any other orders (including a zero-th order), makes an amount of minus-second-order diffracted light of the second light flux which has passed through the first optical path difference providing structure larger than amounts of diffracted light of any other orders (including a zero-th order), and makes an amount of minus-third-order diffracted light of the third light flux which has passed through the first optical path difference providing structure larger than amounts of diffracted light of any other orders (including a zero-th order).

17. The optical pickup apparatus of claim 11, wherein the one of the highest step and the lowest step satisfies the following relational expression:

$$0.4w2 \leq w1 \leq 0.6w2 \tag{2}.$$

18. The optical pickup apparatus of claim 11, wherein amounts of step differences in a direction of the optical axis are almost same to each other, where each of the step differences is formed between neighboring steps in the step units.

19. The optical pickup apparatus of claim 11, wherein widths in a perpendicular direction to the optical axis of the steps excluding the one of the highest step and the lowest step satisfying the expression (1) are uniform in terms of a function.

20. The optical pickup apparatus of claim 11, wherein in one of the step units, widths in a direction perpendicular to the optical axis of the steps excluding the one of the highest step and the lowest step satisfying the expression (1) are almost same to each other.

* * * * *